(12) United States Patent
Cassella et al.

(10) Patent No.: US 12,530,556 B2
(45) Date of Patent: Jan. 20, 2026

(54) ULTRA-HIGH-FREQUENCY SUBHARMONIC TAGS FOR PASSIVE AND FAR-FIELD IDENTIFICATION

(71) Applicant: Northeastern University, Boston, MA (US)

(72) Inventors: Cristian Cassella, Boston, MA (US); Hussein Hussein, Boston, MA (US)

(73) Assignee: Northeastern University, Boston, MA (US)

( * ) Notice: Subject to any disclaimer, the term of this patent is extended or adjusted under 35 U.S.C. 154(b) by 5 days.

(21) Appl. No.: 18/700,099

(22) PCT Filed: Oct. 18, 2022

(86) PCT No.: PCT/US2022/046973
§ 371 (c)(1),
(2) Date: Apr. 10, 2024

(87) PCT Pub. No.: WO2024/096848
PCT Pub. Date: May 10, 2024

(65) Prior Publication Data
US 2025/0232149 A1 Jul. 17, 2025

Related U.S. Application Data

(60) Provisional application No. 63/331,838, filed on Apr. 17, 2022, provisional application No. 63/257,075, filed on Oct. 18, 2021.

(51) Int. Cl.
*G06K 19/07* (2006.01)
*H03H 9/64* (2006.01)

(52) U.S. Cl.
CPC ......... *G06K 19/0723* (2013.01); *H03H 9/642* (2013.01)

(58) Field of Classification Search
CPC .......................... G06K 19/0723; H03H 9/642
(Continued)

(56) References Cited

U.S. PATENT DOCUMENTS

| 8,358,209 B2 | 1/2013 | Shafer et al. |
| 10,929,620 B2 | 2/2021 | Chahal et al. |

(Continued)

OTHER PUBLICATIONS

Hussein et al., "A chip-less and battery-less subharmonic tag for wireless sensing with parametrically enhanced sensitivity and dynamic range", Scientific Reports vol. 11, Article No. 3782 (2021), 11 pages.

(Continued)

*Primary Examiner* — Allyson N Trail
(74) *Attorney, Agent, or Firm* — Verrill Dana, LLP

(57) ABSTRACT

Subharmonic tags for passive far-field sensing are provided having at least one antenna configured to receive an interrogation signal having a plurality of interrogation frequencies, a passive LTI network in electrical communication with the at least one antenna, and two or more resonators, each resonator having a different resonant frequency and a corresponding trigger frequency different than the resonant frequency, wherein the passive LTI network is configured such that the tag only produces a response signal for trigger frequencies that are different from any of the resonant frequencies of the resonators, each resonator of the subharmonic tag configured to produce a response signal having a different frequency than the trigger frequency, the subharmonic tag configured to produce an output signal responding to the interrogation signal, the output signal including one or more of the response signals.

21 Claims, 23 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2008/0137694 A1* | 6/2008 | Park | H01S 5/0625 372/18 |
| 2016/0328584 A1 | 11/2016 | Rokhsaz et al. | |
| 2021/0318178 A1* | 10/2021 | Cassella | H04B 5/45 |

OTHER PUBLICATIONS

Hussein et al., "Systematic Synthesis and Design of Ultralow Threshold 2:1 Parametric Frequency Dividers", IEEE Transactions on Microwave Theory and Techniques, vol. 68, No. 8, pp. 3497-3509, (2020).
Su et al., "A MIMO Radar Signal Processing Algorithm for Identifying Chipless RFID Tags", Sensors 2021, 21(24), 8314, pp. 1-14.
Bottigliero et al., "An innovative harmonic radar prototype for miniaturized lightweight passive tags tracking", (2019) IEEE Radar Conference (RadarConf), pp. 1-6.
Yu et al., "Highly-Linear Magnet-Free Microelectromechanical Circulators", Journal of Microelectromechanical Systems, (2019), vol. 28, issue 6, pp. 933-940.
Torunbalci et al., "An FBAR Circulator", IEEE Microwave and Wireless Components Letters, (2018), vol. 28, No. 5, pp. 395-397.
Cassella et al., "Radio Frequency Angular Momentum Biased Quasi-LTI Nonreciprocal Acoustic Filters", IEEE Transactions on Ultrasonics Ferroelectrics and Frequency Control (2019), vol. 66, No. 11, pp. 1814-1825.
Alvarez-Melcon et al., "Coupling Matrix Representation of Nonreciprocal Filters Based on Time Modulated Resonators", IEEE Transactions on Microwave Theory and Techniques (2019), vol. 67, No. 12, pp. 4751-4763.
Heiss, "The physics of exceptional points", Journal of Physics A: Mathematical and Theoretical (2012), vol. 45, No. 44, 444016, 13 pages.
Kirkpatrick et al., "Influence of harmonic radar tag attachment on nymphal Halyomorpha halys mobility, survivorship, and detectability", Entomologia Experimentalis et Applicata (2019), vol. 167, No. 12, pp. 1020-1029.

Xing et al., "A novel identification method of mul¬tiple ofc saw sensor tags", 10th IEEE International Conference on Nano/Micro Engineered and Molecular Systems. IEEE, (2015), pp. 187-192.
Huseein et al., "A linbo 3-based sub-harmonic tag for passive and far-field identification," (2022) IEEE 35th International Conference on Micro Electro Mechanical Systems Conference (MEMS). pp. 1022-1025.
Cassella et al., "AIN two-dimensional-mode resonators for ultra-high frequency applications," IEEE Electron Device Letters, vol. 36, No. 11, pp. 1192-1194, (2015).
Sounas et al., "Broadband passive isolators based on coupled nonlinear resonances," Nature Electronics, vol. 1, No. 2, pp. 113-119, (2018).
Zhou et al., "Receiver with Integrated Magnetic-Free N-Path-Filter-Based Non-Reciprocal Circulator and Baseband Self-Interference Cancellation for Full-Duplex Wireless," 63rd IEEE International Solid-State Circuits Conference, ISSCC 2016. Institute of Electrical and Electronics Engineers Inc., (2016), pp. 178-180.
Sheikh et al., "Angular wall loss model and extended building penetration model for outdoor to indoor propagation," (2017) 13th International Wireless Communications and Mobile Computing Conference (IWCMC). pp. 1291-1296.
Hussein et al., "Capturing and recording cold chain temperature violations through parametric alarm-sensor tags," Applied Physics Letters, vol. 119, No. 1, p. 014101, (2021), 6 pages.
Hussein et al., "Giant sensitivity through fully-passive and chip-less parametric temperature sensors," (2020) IEEE Sensors. IEEE, pp. 1-4.
Colombo et al., "High-Figure-of-Merit X-Cut Lithium Niobate MEMS Resonators Operating Around 50 MHz for Large Passive Voltage Amplification in Radio Frequency Applications," IEEE Transactions on Ultrasonics, Ferroelectrics, and Frequency Control, vol. 67, No. 7, pp. 1392-1402, (2020).
Cassella et al., "Low Phase-Noise Autonomous Parametric Oscillator Based on a 226.7 MHz AlN Contour-Mode Resonator", IEEE Transactions on Ultrasonics, Ferroelectrics, and Frequency Control, vol. 62, No. 4, pp. 617-624, (2015).
Hussein et al., "Parametric Acoustic-based Passive Transponders for Ultra-sensitive Temperature and Temperature-Threshold Sensing" 2021 Joint Conference of the European Frequency and Time Forum and IEEE International Frequency Control Symposium (EFTF/IFCS). IEEE, (2021) pp. 1-4.

* cited by examiner

ULTRA-HIGH-FREQUENCY SUBHARMONIC TAGS FOR PASSIVE AND FAR-FIELD IDENTIFICATION

CROSS REFERENCE TO RELATED APPLICATIONS

This application claims benefit under 35 U.S.C. § 119(e) of U.S. Provisional Application No. 63/331,838, filed on 17 Apr. 2022, entitled "Ultra-High-Frequency Subharmonic Tags for Passive and Far-Field Identification" and U.S. Provisional Application No. 63/257,075, filed on 18 Oct. 2021, entitled "Ultra-High-Frequency Subharmonic Tags for Passive and Far-Field Identification" the entirety of which is incorporated by reference herein.

STATEMENT REGARDING FEDERALLY SPONSORED RESEARCH OR DEVELOPMENT

This invention was made with government support under Grant Number 1854573 awarded by NSF National Science Foundation. The government has certain rights in the invention.

BACKGROUND

The development of new algorithms of cloud storage and cloud computing and the unprecedented growth of Artificial Intelligence (AI) have built the foundations of new distributed sensing networks relying on widespread deployments of wireless sensor nodes (WSNs) to assess critical environmental and structural parameters with unprecedented spatial resolutions. In this regard, it is now envisioned that the massive amount of information sensed by such WSNs can be used to train and improve AI models towards the achievement of specific objectives, such as the reduction of greenhouse-gas (GHG) emissions, a fine-grained structural monitoring of buildings or other civil infrastructures, the minimization of wastes along the supply and distribution chains of foods and drugs and much more. Due to the extent of such distributed sensing networks, next-generation interrogating nodes will need to reliably distinguish data streams simultaneously coming from unprecedented and continuously growing numbers of WSNs. As a result, only the WSNs equipped with radio-frequency (RF) identification features, marking their output signal with their own unique signature, are suitable for future massive sensing infrastructures. Yet, up to today, most of the available WSNs equipped with identification features employ integrated circuits (ICs), even relying on batteries when sensing ranges exceeding few meters are needed. Also, the adoption of batteries leads to significant maintenance duties and costs not suitable for any massive scale WSN deployments, even causing a serious environmental burden whenever dead batteries must be disposed. So, growing attention is being paid to chip-less passive tags (PTs) since they are battery-less and they are manufacturable at reduced fabrication costs. Also, even though PTs allow sensing performance and range typically lower than those attained by any battery-powered counterparts, they do not require periodic and costly maintenance. Moreover, PTs are suited to operate under harsh environmental conditions, thanks to their ability to properly function without requiring any batteries or any integrated circuits (ICs) and thanks to the fact that no periodic maintenance is needed.

The majority of existing PTs can be grouped into two categories, electromagnetic-based (EM) and acoustic-based (ACO) PTs, depending on the physical domain leveraged to implement their sensing and identification functionalities. In particular, EM PTs rely on lumped or distributed electrical components whereas the existing ACO tags leverage the excitation of surface acoustic waves (SAWs) in single crystal piezoelectric films. Most existing EM and ACO PTs rely on time-domain-reflectometry (TDR) techniques. Consequently, they require high delay elements to allow their complementary readers to distinguish any remotely sensed backscattered information from EM clutter, multipath and self-interference. Also, the encoding data capacity (EDC) of TDR-based PTs, consisting of the maximum number of bits that can be used to mark any desired item with a Unique Identifier (UID) code, is proportional to the product of the delay ($\tau$) generated by such PTs and the usable bandwidth (BW), which is typically set by ITU regulations). Due to the high speed of EM waves, the $\tau$ value generated by any reasonably sized EM components is limited to a few nanoseconds. Such a relatively low delay has severely limited the interrogation range (d) of most of the existing EM tags, even when relying on readers embodying high gain transmitting antennas. Even more, the $\tau$ value of the EM tags used for identification also has a strong impact on their achievable EDC. Differently, the low wave speed characterizing the operation of all SAW devices allows TDR-based ACO PTs to exploit $\tau$ values orders of magnitude higher than those attained by the EM counterparts. Nevertheless, the EDC and the interrogation range of the existing TDR-based ACO PTs is limited by transduction and acoustic propagation losses, which significantly increase as larger tag areas are employed to accommodate a higher number of identification bits.

SUMMARY

Provided herein are methods and systems for FDR-based ACO PT for identification, with the ability to ensure long interrogation ranges (d) and high EDCs, while relying on interrogation signals occupying narrow bandwidths (BW). In order to do so, ACO PTs are used to exploit time modulation dynamics to surpass the limits of the available FDR-based counterparts, which are static.

During the last years, a growing attention has been paid to the development of linear-time-variant (LTV) circuits implementing unique RF functionalities. For instance, several RF circulators, filters and isolators have been developed, based on the unique dynamics triggered by the periodic modulation or switching of solid state capacitors. The present inventors have exploited similar dynamics to generate a new class of PTs dubbed as Subharmonic Tags (SubHTs). SubHTs permit to passively sense any parameter-of-interest (PoI) with dynamically boosted sensitivity and dynamic ranges. Also, since SubHTs are able to transmit their output signal at a passively generated frequency ($f_{out}$) that is half of the interrogation signal's one ($f_{in}=2f_{out}$), they inherently provide their readers with an unprecedented immunity to self-interference, EM clutter and multipath. Even more, by exploiting exceptional point dynamics, SubHTs allow to address both continuous and threshold sensing functionalities, even allowing to memorize the occurrence of any violations of a targeted PoI without requiring any ad-hoc battery-powered memory devices.

In one aspect, a subharmonic tag for passive far-field sensing is provided. The subharmonic tag includes at least one antenna disposed at a corresponding port, wherein each at least one antenna is configured as an input antenna, an output antenna, or an input/output antenna, the subharmonic tag configured, via the at least one antenna, to receive an interrogation signal having a plurality of interrogation frequencies. The subharmonic tag also includes a passive LTI network in electrical communication with the at least one antenna. The subharmonic tag also includes two or more resonators in electrical communication with the passive LTI network, each resonator having a different resonant frequency and a corresponding trigger frequency, the corresponding trigger frequency being different than the resonant frequency. The passive LTI network is configured such that the tag only produces a response signal for trigger frequencies that are different from any of the resonant frequencies of the resonators. Each resonator of the subharmonic tag is configured, responsive to the corresponding trigger frequency, to produce a response signal having a different frequency than the trigger frequency, the subharmonic tag configured to produce an output signal responding to the interrogation signal, the output signal including one or more of the response signals produced by the resonators.

In some embodiments, the two or more resonators are selected from a group consisting of microacoustic resonators and electromagnetic resonators. In some embodiments, the two or more resonators are MEMS-based resonators. In some embodiments, the resonators comprise at least one piezoelectric material selected from the group consisting of $LiNbO_3$, AlScN, AlCrN, PZT, $LiTaO_3$, GaN, AlN, or combinations thereof. In some embodiments, the two or more resonators include at least one of a surface acoustic resonator, a bulk acoustic resonator, or combinations thereof. In some embodiments, the subharmonic tag comprises three or more resonators, each resonator having a different resonant frequency. In some embodiments, the subharmonic tag comprises eight or more resonators, each resonator having a different resonant frequency. In some embodiments, the subharmonic tag comprises 32 or more resonators, each resonator having a different resonant frequency. In some embodiments, the two or more resonators are built in an array directly on a silicon wafer. In some embodiments, the resonant frequency of each resonator is in the UHF band. In some embodiments, the frequency of the response signal of produced by each resonator corresponds to the resonant frequency of the corresponding resonator. In some embodiments, the frequency of the response signal produced by each resonator is the resonant frequency of the corresponding resonator. In some embodiments, the subharmonic tag is a passive tag and does not include an internal power source.

In another aspect a subharmonic system is provided. The system includes a reader configured to produce an interrogation signal having a plurality of interrogation frequencies. The system also includes a plurality of subharmonic tags for passive far-field sensing. Each subharmonic tag includes at least one antenna disposed at a corresponding port, wherein each at least one antenna is configured as an input antenna, an output antenna, or an input/output antenna, the subharmonic tag configured, via the at least one antenna, to receive the interrogation signal. Each subharmonic tag also includes a passive LTI network in electrical communication with the at least one antenna. Each subharmonic tag also includes two or more resonators in electrical communication with the passive LTI network, each resonator having a different resonant frequency and a corresponding trigger frequency, the corresponding trigger frequency being different than the resonant frequency. The passive LTI network is configured such that the tag only produces a response signal for trigger frequencies that are different from any of the resonant frequencies of the resonators. Each resonator of the subharmonic tag is configured, responsive to the corresponding trigger frequency, to produce a response signal having a different frequency than the trigger frequency, the subharmonic tag configured to produce an output signal responding to the interrogation signal, the output signal including the response signals produced by the resonators.

In some embodiments, the reader is configured to associate the response signals included in the output signal with identification information corresponding to each of the plurality of subharmonic tags to identify the subharmonic tag. In some embodiments, each of the plurality of subharmonic tags has a combination of resonator frequencies that is unique within the system. In some embodiments, each of the plurality of subharmonic tags is associated with an object to be identified or tracked. In some embodiments, each of the plurality of subharmonic tags has a combination of resonator frequencies that is at least one of unique within the system, unique to a type of object associated with the system, unique to a location associated with the system, or combinations thereof. In some embodiments, each of the plurality of subharmonic tags is a passive tag and does not include an internal power source.

In another aspect, a method of identifying or tracking a plurality of objects is provided. The method includes providing a subharmonic system. The system includes a reader configured to produce an interrogation signal having a plurality of interrogation frequencies. The system also includes a plurality of subharmonic tags for passive far-field sensing. Each subharmonic tag includes at least one antenna disposed at a corresponding port, wherein each at least one antenna is configured as an input antenna, an output antenna, or an input/output antenna, the subharmonic tag configured, via the at least one antenna, to receive the interrogation signal. Each subharmonic tag also includes a passive LTI network in electrical communication with the at least one antenna. Each subharmonic tag also includes two or more resonators in electrical communication with the passive LTI network, each resonator having a different resonant frequency and a corresponding trigger frequency, the corresponding trigger frequency being different than the resonant frequency. The passive LTI network is configured such that the tag only produces a response signal for trigger frequencies that are different from any of the resonant frequencies of the resonators. Each resonator of the subharmonic tag is configured, responsive to the corresponding trigger frequency, to produce a response signal having a different frequency than the trigger frequency, the subharmonic tag configured to produce an output signal responding to the interrogation signal, the output signal including the response signals produced by the resonators. The method also includes interrogating the subharmonic tags of the system using the reader. The method also includes receiving output signals from the subharmonic tags of the system using the reader. The method also includes determining a presence, identity, and/or location of the subharmonic tags within the system based on the unique combination of resonance frequencies of each subharmonic tag of the system.

In some embodiments, the step of interrogating comprises emitting a chirp signal using the reader.

Additional features and aspects of the technology include the following:

1. A subharmonic tag for passive far-field sensing comprising:
    at least one antenna disposed at a corresponding port, wherein each at least one antenna is configured as an input antenna, an output antenna, or an input/output antenna, the subharmonic tag configured, via the at least one antenna, to receive an interrogation signal having a plurality of interrogation frequencies;

a passive LTI network in electrical communication with the at least one antenna; and two or more resonators in electrical communication with the passive LTI network, each resonator having a different resonant frequency and a corresponding trigger frequency, the corresponding trigger frequency being different than the resonant frequency;

wherein the passive LTI network is configured such that the tag only produces a response signal for trigger frequencies that are different from any of the resonant frequencies of the resonators, and wherein each resonator of the subharmonic tag is configured, responsive to the corresponding trigger frequency, to produce a response signal having a different frequency than the trigger frequency, the subharmonic tag configured to produce an output signal responding to the interrogation signal, the output signal including one or more of the response signals produced by the resonators.

2. The subharmonic tag of feature 1, wherein the two or more resonators are selected from a group consisting of microacoustic resonators and electromagnetic resonators.

3. The subharmonic tag of feature 2, wherein the two or more resonators are MEMS-based resonators.

4. The subharmonic tag of feature 2, wherein the resonators comprise at least one piezoelectric material selected from the group consisting of $LiNbO_3$, AlScN, AlCrN, PZT, $LiTaO_3$, GaN, AlN, or combinations thereof.

5. The subharmonic tag of feature 2, wherein the two or more resonators include at least one of a surface acoustic resonator, a bulk acoustic resonator, or combinations thereof.

6. The subharmonic tag of any of features 1-5, wherein the subharmonic tag comprises three or more resonators, each resonator having a different resonant frequency.

7. The subharmonic tag of feature 6, wherein the subharmonic tag comprises eight or more resonators, each resonator having a different resonant frequency.

8 The subharmonic tag of feature 7, wherein the subharmonic tag comprises 32 or more resonators, each resonator having a different resonant frequency.

9. The subharmonic tag of any of features 1-8, wherein the two or more resonators are built in an array directly on a silicon wafer.

10. The subharmonic tag of any of features 1-9, wherein the resonant frequency of each resonator is in the UHF band.

11. The subharmonic tag of any of features 1-10, wherein the frequency of the response signal of produced by each resonator corresponds to the resonant frequency of the corresponding resonator.

12. The subharmonic tag of feature 11, wherein the frequency of the response signal produced by each resonator is the resonant frequency of the corresponding resonator.

13. The subharmonic tag of any of features 1-12, wherein the subharmonic tag is a passive tag and does not include an internal power source.

14. A subharmonic system comprising:
a reader configured to produce an interrogation signal having a plurality of interrogation frequencies;
a plurality of subharmonic tags for passive far-field sensing, each subharmonic tag comprising:
at least one antenna disposed at a corresponding port, wherein each at least one antenna is configured as an input antenna, an output antenna, or an input/output antenna, the subharmonic tag configured, via the at least one antenna, to receive the interrogation signal;
a passive LTI network in electrical communication with the at least one antenna; and
two or more resonators in electrical communication with the passive LTI network, each resonator having a different resonant frequency and a corresponding trigger frequency, the corresponding trigger frequency being different than the resonant frequency;
wherein the passive LTI network is configured such that the tag only produces a response signal for trigger frequencies that are different from any of the resonant frequencies of the resonators, and
wherein each resonator of the subharmonic tag is configured, responsive to the corresponding trigger frequency, to produce a response signal having a different frequency than the trigger frequency, the subharmonic tag configured to produce an output signal responding to the interrogation signal, the output signal including the response signals produced by the resonators.

15. The system of feature 14, wherein the reader is configured to associate the response signals included in the output signal with identification information corresponding to each of the plurality of subharmonic tags to identify the subharmonic tag.

16. The system of any of features 14-15, wherein each of the plurality of subharmonic tags has a combination of resonator frequencies that is unique within the system.

17. The system of any of features 14-16, wherein each of the plurality of subharmonic tags is associated with an object to be identified or tracked.

18. The system of feature 17, wherein each of the plurality of subharmonic tags has a combination of resonator frequencies that is at least one of unique within the system, unique to a type of object associated with the system, unique to a location associated with the system, or combinations thereof.

19. The system of any of features 14-18, wherein each of the plurality of subharmonic tags is a passive tag and does not include an internal power source.

20. A method of identifying or tracking a plurality of objects, the method comprising:
providing a subharmonic system, the system including:
a reader configured to produce an interrogation signal having a plurality of interrogation frequencies;
a plurality of subharmonic tags for passive far-field sensing, each subharmonic tag comprising:
at least one antenna disposed at a corresponding port, wherein each at least one antenna is configured as an input antenna, an output antenna, or an input/output antenna, the subharmonic tag configured, via the at least one antenna, to receive the interrogation signal;
a passive LTI network in electrical communication with the at least one antenna; and
two or more resonators in electrical communication with the passive LTI network, each resonator having a different resonant frequency and a corresponding trigger frequency, the corresponding trigger frequency being different than the resonant frequency;
wherein the passive LTI network is configured such that the tag only produces a response signal for trigger frequencies that are different from any of the resonant frequencies of the resonators, and
wherein each resonator of the subharmonic tag is configured, responsive to the corresponding trigger frequency, to produce a response signal having a different frequency than the trigger frequency, the subharmonic tag configured to produce an output signal responding to the interrogation signal, the output signal including the response signals produced by the resonators;

interrogating the subharmonic tags of the system using the reader;

receiving output signals from the subharmonic tags of the system using the reader; and determining a presence, identity, and/or location of the subharmonic tags within the system based on the unique combination of resonance frequencies of each subharmonic tag of the system.

21. The method of feature 20, wherein the step of interrogating comprises emitting a chirp signal using the reader.

DESCRIPTION OF THE DRAWINGS

Embodiments of the present disclosure are described by the way of example with references to the accompanying drawings, which are schematic and are not intended to be drawn to scale. The drawings referenced herein form a part of the specification. Features shown in the drawings are meant as illustrative of only some aspects of the presently disclosed embodiments.

DETAILED DESCRIPTION

Figure 1A:
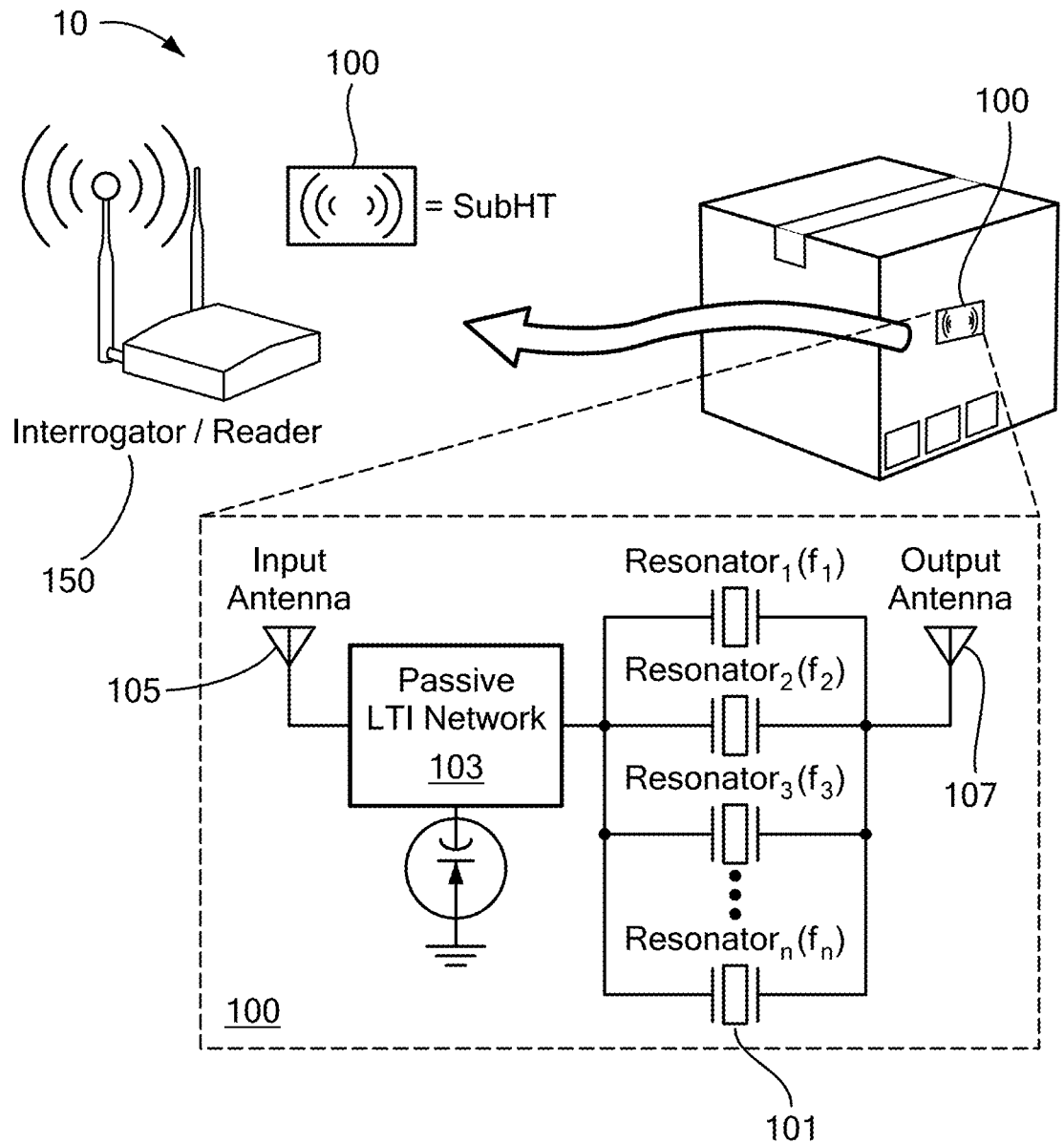
FIG. 1A is system and schematic illustration of a SubHT being used for item identification in accordance with various embodiments.
Figure 1B:
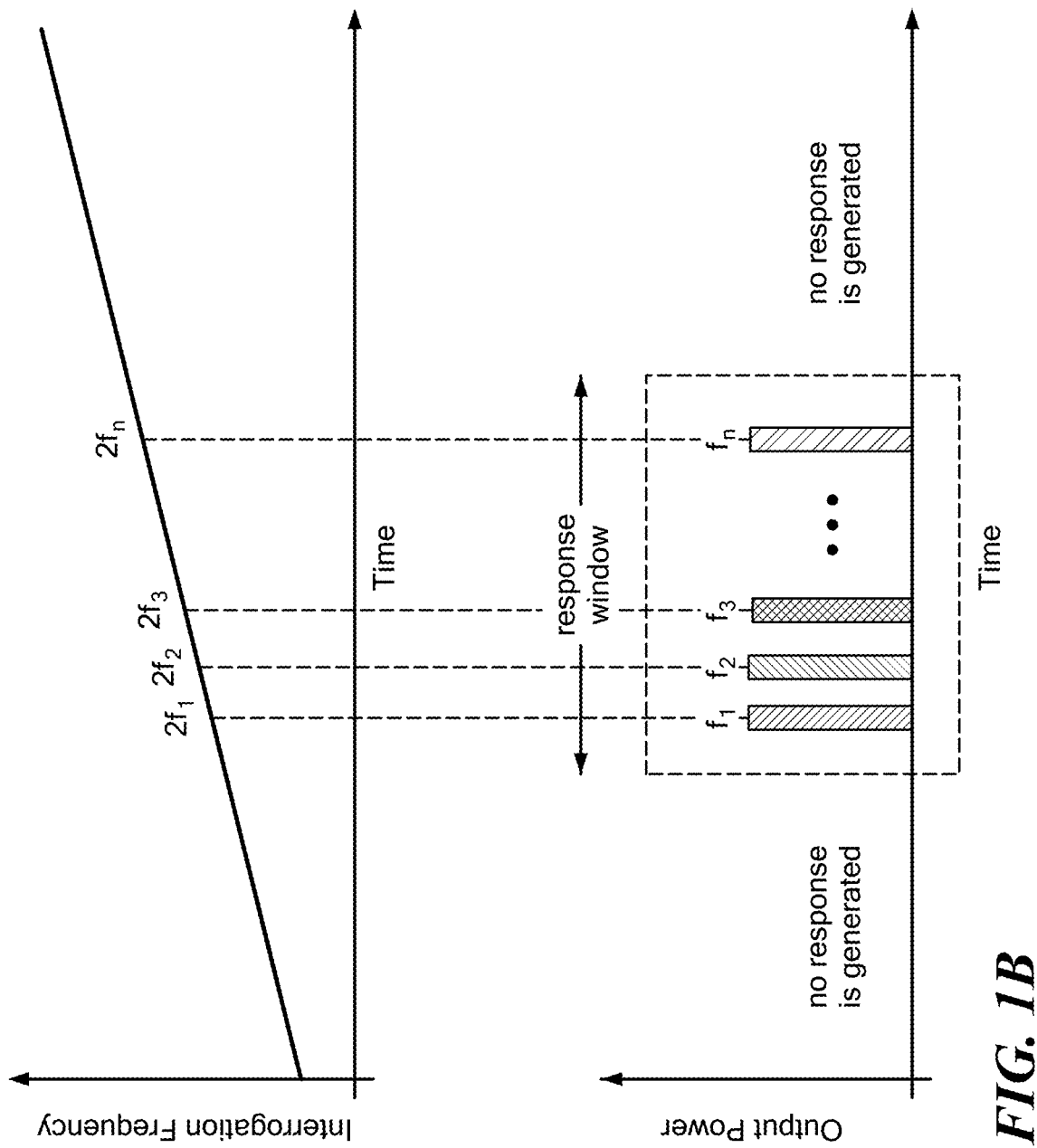
FIG. 1B illustrates a typical time distribution of an interrogation frequency and output power of the SubHT of FIG. 1A. As shown, the SubHT responds to a chirp signal with a sequence of subharmonic signals having frequency determined by the resonance frequencies ($f_1, f_2, f_3, \ldots, f_n$) of a set of microacoustic resonators in accordance with various embodiments.
Figure 1C:
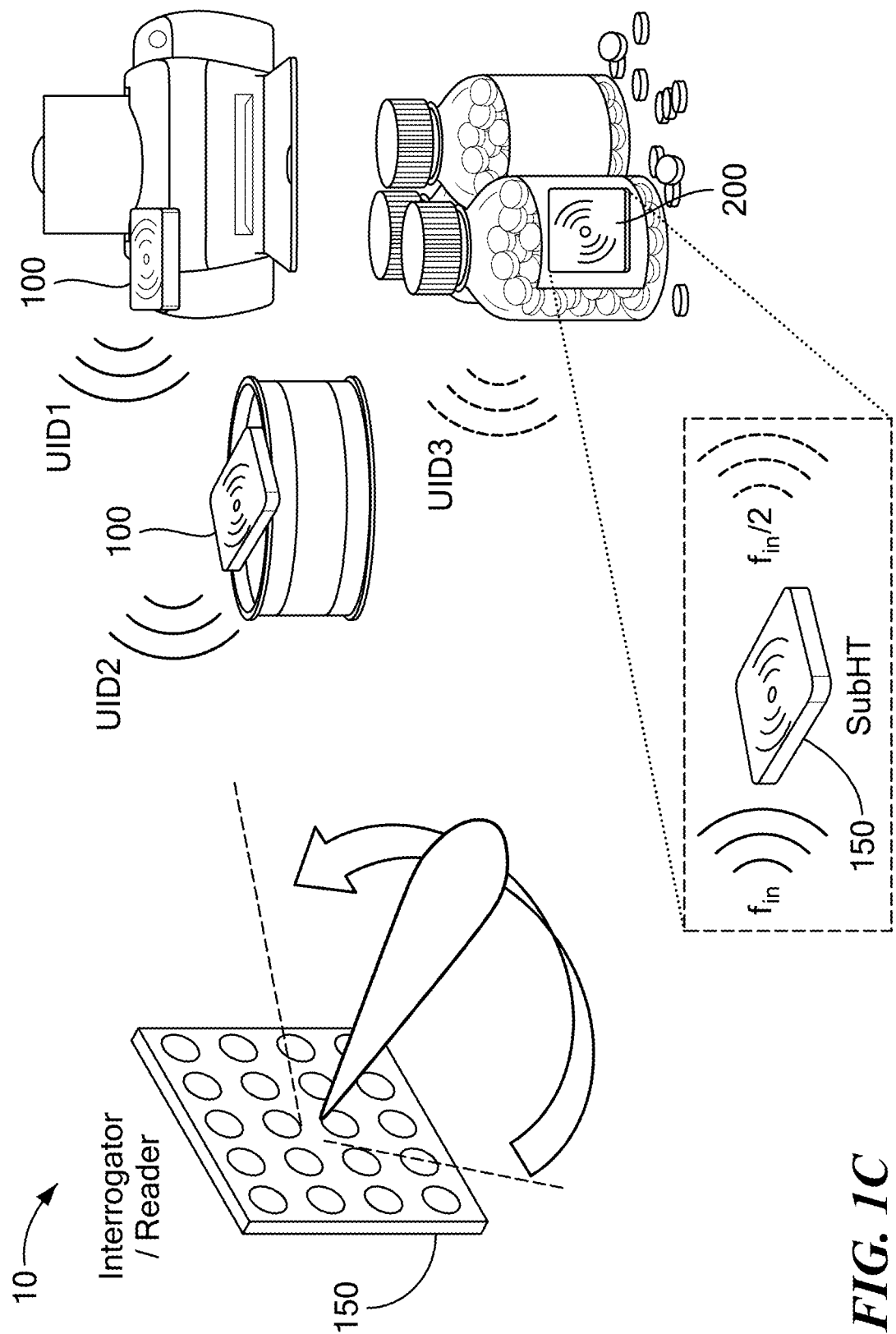
FIG. 1C is a system illustration of SubHTs implemented as unique identifiers (UIDs) for identification, where an interrogator is configured to successively scan different SubHTs at a $f_{in}$ and read the generated UID at $f_{in}/2$ in accordance with various embodiments.
Figure 2A:
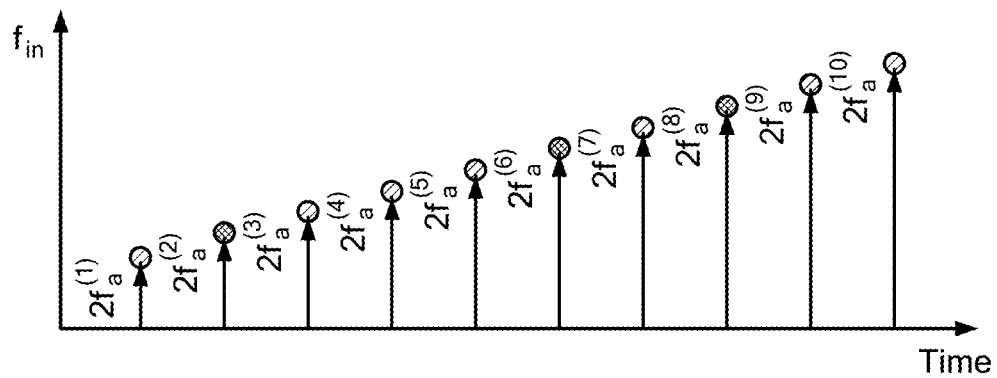
FIG. 2A illustrates a time distribution of a SubHT's interrogation frequency in accordance with various embodiments.
Figure 2B:
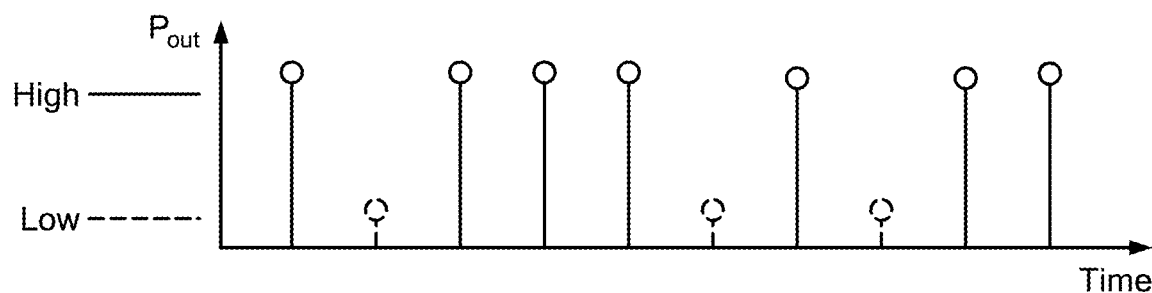
FIGS. 2B and 2C illustrates a time distribution of a SubHT's output frequency when the tag is driven by the chirp interrogation signal of FIG. 2A. As shown, the SubHT stops generating subharmonic output signals whenever the chirp interrogation signal has instantaneous frequency that is equal or nearly equal to the parallel resonance frequency of any one of the employed resonators.
Figure 2C:
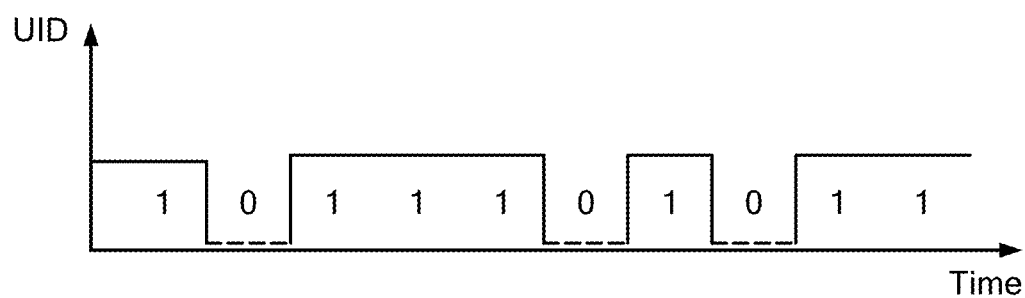
Figure 2D:
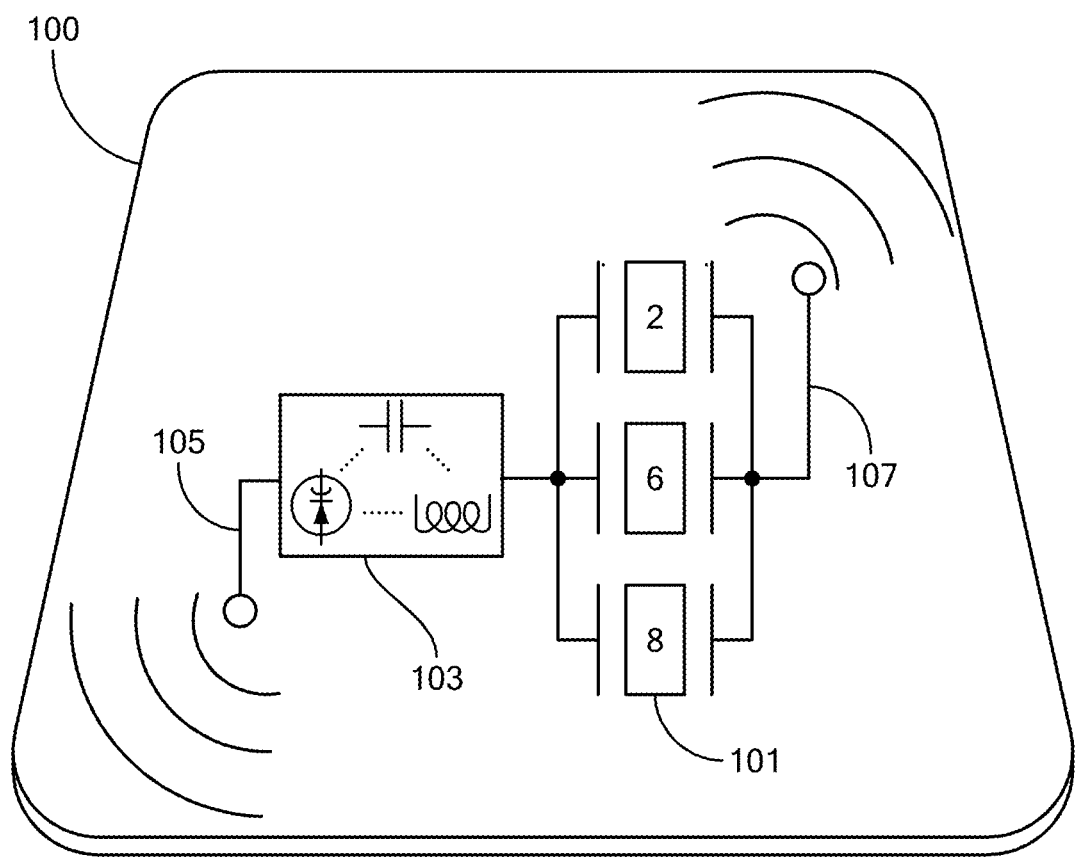
FIG. 2D is a schematic view of an interrogation device used for identification of one or more SubHTs in accordance with various embodiments.
Figure 3A:
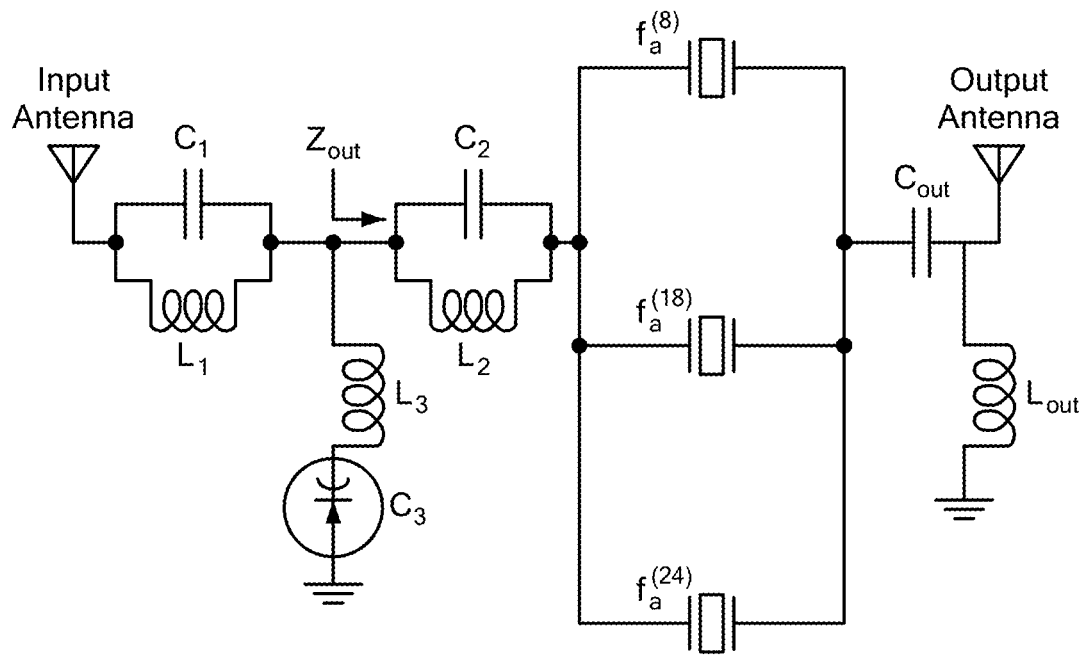
FIG. 3A-3C illustrate circuit schematics of three different prototype SubHTs used in a pAG-based HB simulation as described herein in accordance with various embodiments. The simulations were configured to verify the possibility of generating 32-bit UID codes through the adoption of up to 32 acoustic resonators with electromechanical performance comparable to the performance exhibited by the commercially available SAW devices used for the prototype. The schematic includes ideal capacitors, a set of inductors with a fixed quality factor (~80), the same varactor used in the experiment, two 50Ω antennas, and different combinations of acoustic devices in sets of up to 32 devices. Each acoustic device has a unique resonance frequency and has been modelled through an MBVD equivalent circuit in which the same loaded Q and $k_t^2$ values exhibited by the commercially available SAW devices of the prototype were used.
Figure 3B:
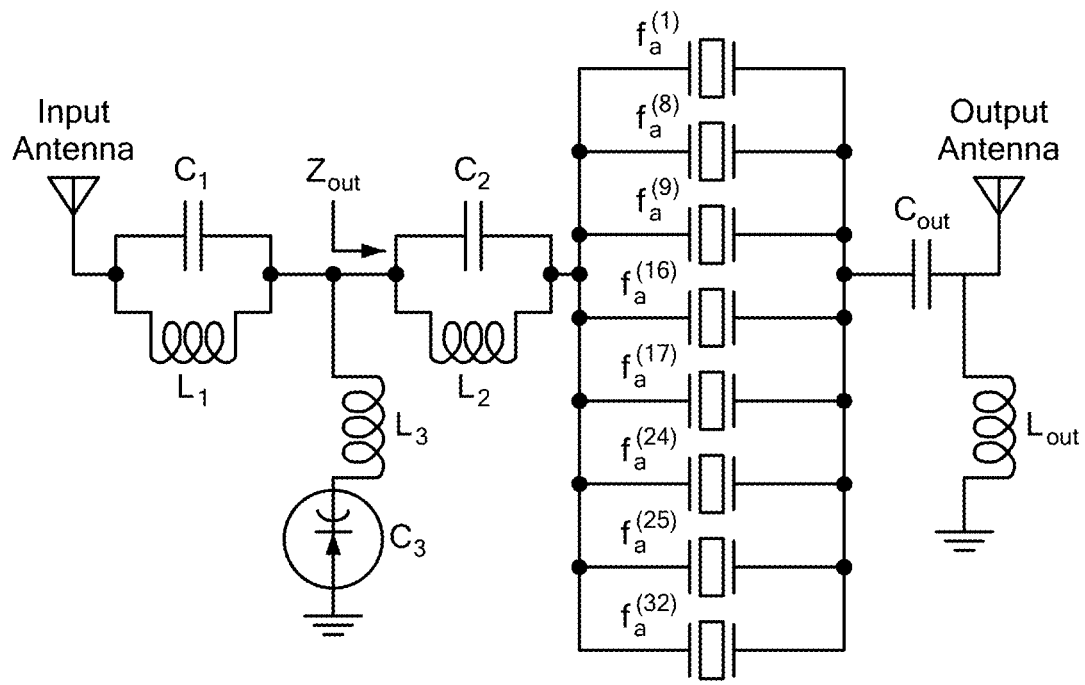
Figure 3C:
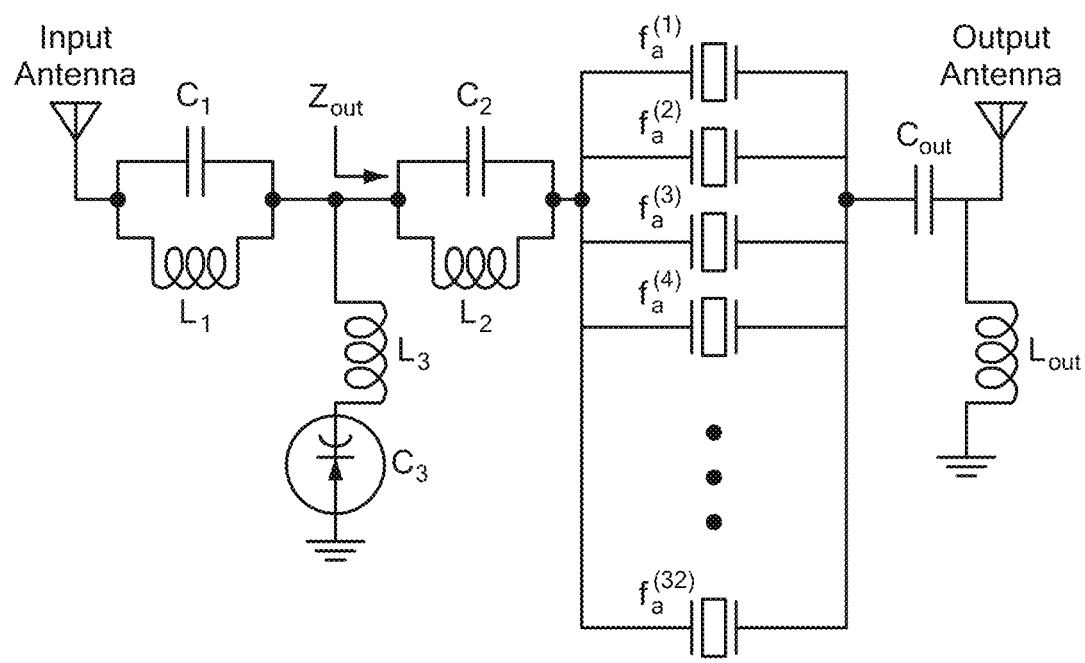
Figure 3D:
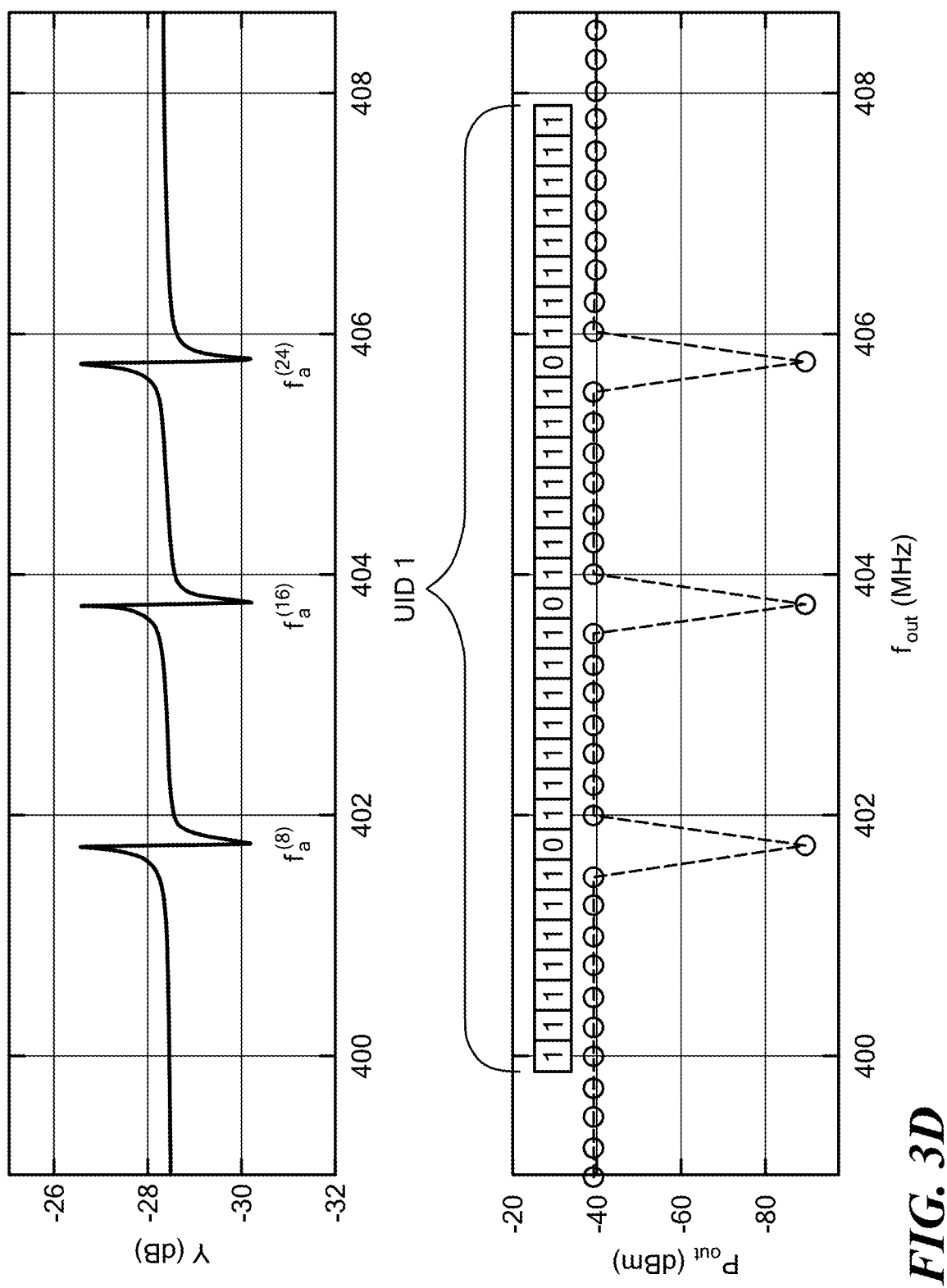
FIGS. 3D-3F illustrate admittances (Y) and $P_{out}$ vs. $f_{out}$ of each respective one the SubHTs illustrated in FIGS. 3A-3C. By comparing across FIGS. 3D-3F, simulated $P_{out}$ vs. $P_{out}$ trends relative to the SubHTs in FIGS. 3A-3C can be seen as well as $f_{out}$ values equal to half of the chirp interrogation signal's frequency (varying from 800 MHz to 816 MHz with 500 kHz steps) is also shown. For each one of FIGS. 3A-3C, a fixed $P_{in}$ value of −15 dBm was used and the corresponding UID code is also illustrated as a stream of one- and zero-bits in a 32-bit window.
Figure 3E:
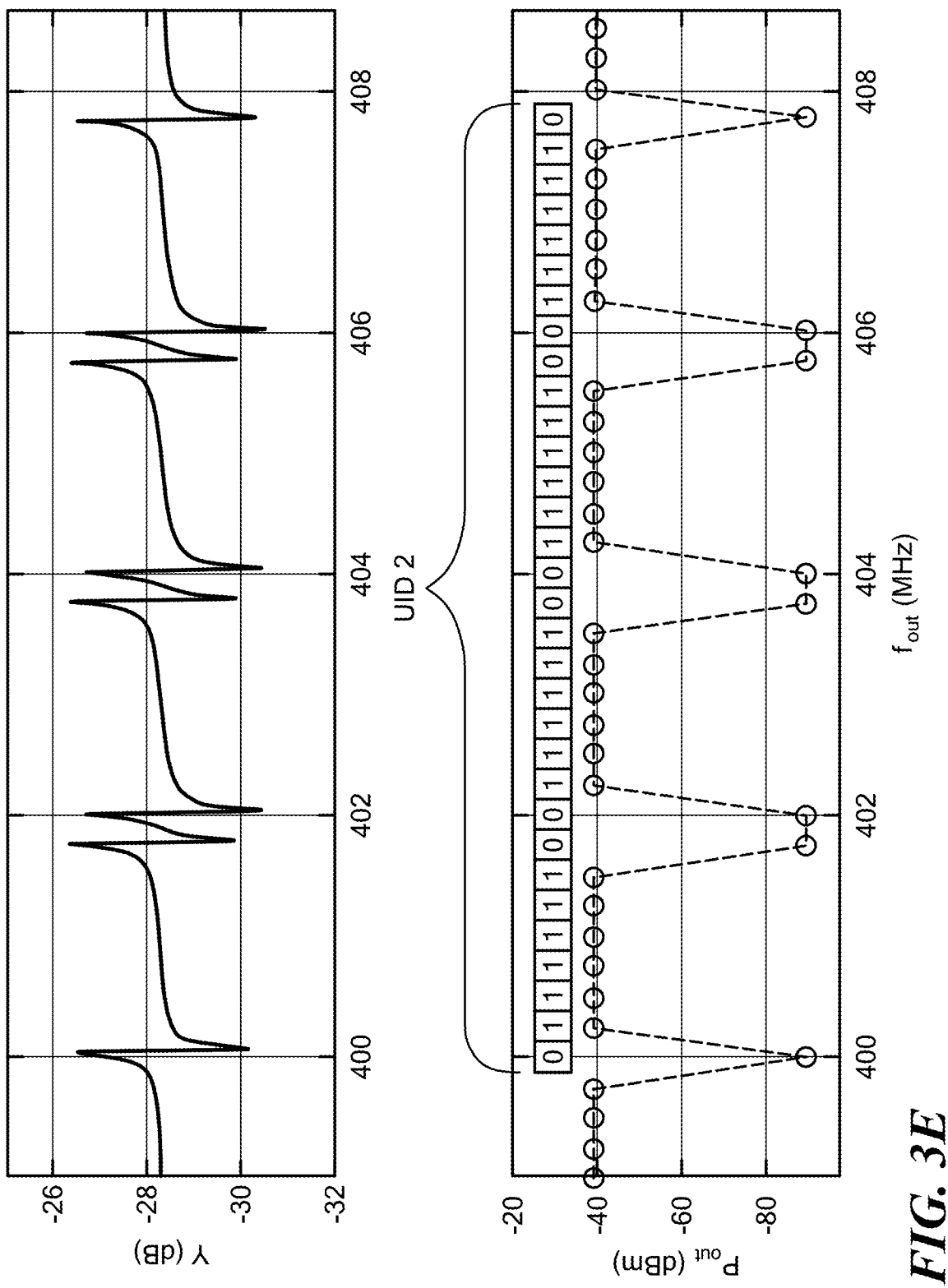
Figure 3F:
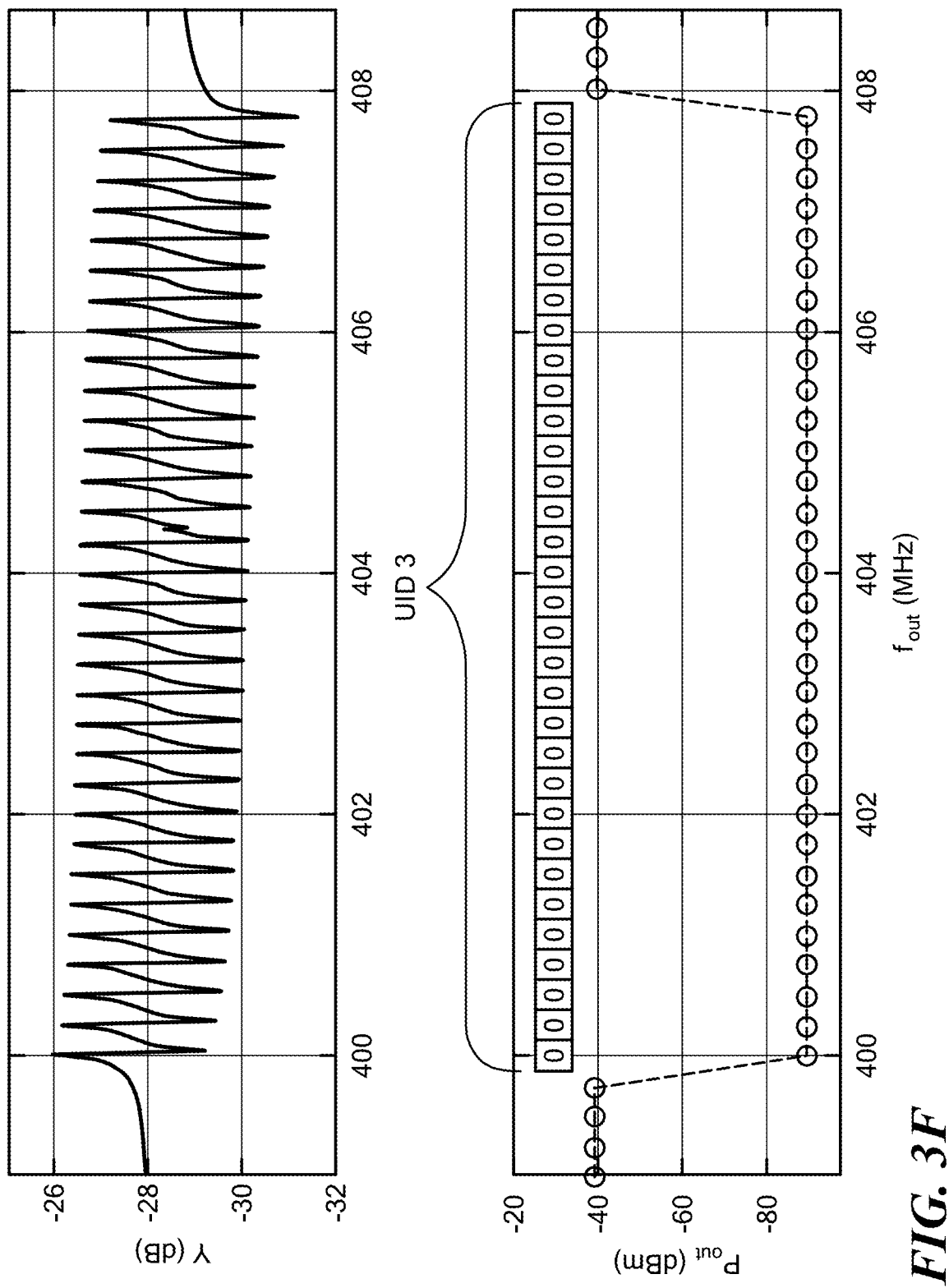

As described in detail above, passive far-field sensing and identification presents unprecedented and unique challenges. Provided herein are passive subharmonic tags (SubHTs) for far-field sensing and identification. Referring now to FIGS. 1A-1C, SubHTs 100 allow for systems such as identification systems 10 to leverage the combined dynamics of high-Q resonators 101 (e.g., resonators 101 such as, for example, acoustic resonators, microacoustic resonators, electromagnetic resonators, or combinations thereof, including, for example, surface acoustic wave resonators, bulk acoustic wave resonators, any other resonator using surface acoustic or bulk acoustic technologies, or combinations thereof) and those of solid-state components to enable a long-range passive identification functionality without requiring any active components or any ad-hoc memory devices. The resonators 101 can have resonant frequencies in any suitable band, including (as described in more detail below) the UHF band (300 MHz to 3 GHz). In some embodiments, including various exemplary embodiments described in detail below, the use of SubHTs 100 can be extended even to large deployments of wireless sensor nodes (WSNs), each of which can distinguish data coming from a plethora of other devices (e.g., similar to and/or scaled up from the identification system 10 shown in FIG. 1C).

For clarity, as used herein, "passive" refers to subharmonic tags, chips, circuitry, or other structures that function without any internal power source and without a direct wired connection to A/C mains or other power sources.

Referring now to FIGS. 1A and 1B, in some embodiments, each SubHT 100 includes a network of resonators 101 to respond to a chirped interrogation signal (e.g., from an interrogator/reader 150) with a sequence of passively generated subharmonic signals, each having an instantaneous frequency set by the resonance frequency of a dedicated resonator 101. When triggered by such a frequency ramping interrogating signal, the SubHT 100 includes one or more LC notch filters (bandpass filters) (see FIGS. 2D, 3A-3C, and 11B) in a passive linear time-invariant (LTI) network 103 such that the SubHT 100 generates and radiates an output signal only during those time frames wherein the interrogation frequency is twice or nearly twice the resonance frequency ($f_1$, $f_2$, $f_3$, ..., $f_n$) of the included resonant devices 101. As such, the SubHT's 100 output signal has an instantaneous frequency almost discretely varying among $f_1$, $f_2$, $f_3$, ..., and $f_n$. Such a radiated pool of frequencies can be used as a code for identifying any monitored WSNs.

Although shown and described herein as including both an input antenna 105 and a separate output antenna 105 (a two-port system), in some embodiments a single antenna port can be used in connection with an antenna configured to both receive an input and passively transmit an output. In some embodiments, more than two antennae may be used such as, for example, wherein a single SubHT 100 includes a plurality of resonator 101 arrays, each array configured to respond to interrogation signals from a different frequency band.

SubHTs 100 can be configured in any suitable manner, including, for example, the FDR-based ACO SubHT prototypes (see FIGS. 3A-3C and 11B) used in connection with the prototypes described herein, ensuring an identification functionality through the adoption of different networks of SAW resonators 101. In particular, any connected SAW device locally reshapes the stability region of such SubHT prototypes. As a result, the frequency division mechanism responsible for the generation of these prototypes' output power is deactivated for interrogation frequencies that are twice or nearly twice the parallel resonance frequencies ($f_a$) of the connected SAW devices. This unique operational feature permits to generate different remotely transferrable UID codes, encoding the presence or the absence of subharmonic output signals at preselected frequencies ($f_1$, $f_2$, ..., $f_M$) as a sequence of M-bits with values equal to 1 or 0, respectively. More specifically, the only zero-bits in such UID codes correspond to the preselected frequencies matching or closely matching the parallel resonance frequencies ($f_a^{(1)}$, $f_a^{(2)}$, ..., $f_a^{(N)}$) of the 'N' adopted SAW devices.

While any acoustic or electromagnetic resonator technologies can be employed to build SubHT prototypes used for identification while enabling different EDCs, a set of two commercially available high quality factor ($Q\sim10^4$) SAW resonators has been used in the prototypes described herein. As described below, the selection of such high-Q acoustic devices permits maximization of both the interrogation range and the achievable EDC, given any targeted BWs. Through the three prototypes described herein, it is shown how the time variant dynamics of SubHTs, together with the high frequency selectivity of acoustic resonators, can be leveraged to provide UHF IoT readers with the ability to remotely identify an item, even when employing transmitting and receiving antennas with low or moderate gains. However, as noted above, the SubHT's described herein can be used in connection with a wide variety of frequencies and are not limited to UHF.

Also, while the SubHTs presented here incorporate up to two acoustic resonators (i.e. the only ones commercially available in the current band of interest), thus being suitable to form UID codes with a maximum number of zero bits equal to two, they are scalable to achieve UID codes formed by higher numbers of zero-bits through the adoption of larger arrays of acoustic devices. Depending on the selected acoustic technology, these arrays can even be monolithically integrated on the same substrate in favor of the highest degree of miniaturization and the lowest manufacturing cost. The demonstration of the SubHTs discussed in this work paves a new effective way towards the remote identification of a massive number of items.

Subharmonic Tags

The recent development of SubHTs has generated the unique capability to remotely, reliably and continuously share Information-of-Interest (IoI) with any interrogating nodes. The IoI can include UID codes relative to specific objects or, alternatively, in the remotely sensed value of a physical, chemical or biological parameter. Differently from the conventional EM and ACO PTs, SubHTs can transmit their output signal over a dedicated channel separated from the one used by their interrogating signal. This approach, even though it does not require any bulky EM delaying elements or any ACO delay lines with significant acoustic and transduction losses, permits to overcome the significant performance degradation affecting the existing TDR-based PTs and caused by electromagnetic clutter, readers' self-interference and multi-path. Moreover, differently from the also recent harmonic tags (HTs) that leverage the polynomial nonlinearities of solid-state components to access an output frequency that is twice their interrogation frequency, SubHTs rely on an $f_{out}$ value that is half of $f_{in}$. Such a full-duplex characteristic, originated from special dynamics triggered by the time-modulation of one of the SubHTs' reactive components, makes SubHTs able to transmit their IoI over longer distances than what possible with HTs. This is due to the 12 dB lower path-loss that the output signal of SubHTs undergoes with respect to the one of any HTs driven by the same interrogation signal, as well as to the relatively high power level that any readers for HTs must receive to distinguish the remotely received IoI from the nonlinearly generated second harmonic of their transmitted signal leaking into the RX module. The range advantage of SubHTs over HTs becomes even more significant when $f_{in}$ is in the GHz frequency range. In fact, in such operational scenario, the output signal of HTs is largely attenuated by any surrounding objects, differently from the SubHTs' output signal that is characterized by a much lower frequency. Also, by exploiting the non-Hermitian dynamics of parametric systems operating in the proximity of exceptional points (EPs), the SubHTs used for remote sensing can achieve boosted sensitivities and dynamic ranges with respect to any other PTs. The same dynamics have also recently enabled a threshold sensing functionality, equipped with a dynamic memory capability, without requiring any power-hungry memory devices.

In the most simplistic representation, a SubHT 100 can be described as a two-port network formed by a set of passive components 103 and by an unbiased variable reactance (see FIGS. 2A-2D). For convenience, a solid-state hyperabrupt varactor is generally chosen as the variable reactance due to its high tuning range. The input and output ports of any SubHTs 100 are connected to proper antennas 105, 107, allowing the reception of the interrogating signal as well as the transmission of any IoI. The activation of the period-doubling mechanism responsible for the generation of the SubHTs' output signal depends on both the strength and the frequency of their interrogating signal. More specifically, SubHTs generate their output signal only when the received input power level ($P_{in}$) is greater than a certain threshold ($P_{th}$). $P_{th}$ is controlled by the impedances seen by the variable capacitor at both $f_{in}$ and $f_{out}$. Therefore, using frequency selective components in the SubHTs' input or output networks allows to preselect the range of $f_{in}$ values (and consequently the range of $f_{out}$ values) wherein these tags can respond to any interrogation signal. As explained in the next section, this feature can be used to grant SubHTs a passive identification functionality, enabling their use in any wireless sensor networks.

Simulation Challenges

Modelling the operation of SubHTs in commercial circuit simulators, independently on whether time or frequency domain techniques are used, is as challenging as in the other types of degenerate parametric circuits discussed above. In particular, the adoption of time-domain techniques inevitably comes with long computation times and with significant convergence issues, especially when the analyzed circuit includes components with long relaxation times (i.e. high-Q). These issues are caused by the presence of bifurcations, marking the transition from a non-frequency dividing regime to a frequency dividing one. Even though frequency-domain algorithms like Harmonic Balance (HB) are faster than the time domain ones, their use is still challenging since commercial frequency-domain simulators cannot detect any currents or voltages generated at subharmonic frequencies of the input signals. Consequently, by default, most HB simulators are not able to detect the rising of subharmonic oscillations, like the oscillations triggered in SubHTs for $P_{in} \geq P_{out}$. Nevertheless, several alternative techniques have been lately introduced to model the frequency-dividing operation of parametric systems through commercial HB algorithms. Among such methods, the present inventors have developed the Power Auxiliary Generator (pAG) technique. This technique relies on the adoption of an artificial power generator in the analyzed degenerate parametric circuit on behalf of an arbitrarily selected resistor. The generator is configured to operate at half of the targeted input frequency ($f_{in}^r$). This permits to insert the corresponding subharmonic output tone (i.e., $f_{in}^r/2$) into the vector of frequencies used by HB simulators in order to find the steady-state solution of a circuit. At the same time, by setting an extremely low available power for such auxiliary generator and by making the generator's characteristic impedance equal to the value of the replaced resistor in the circuit, it is ensured that no undesired changes in the operational point of any included nonlinear components occur. This permits to satisfy the non-perturbation condition for the auxiliary generator in the circuit, providing the fundamental means to design and model any parametric systems operating beyond their power threshold. Nevertheless, due to the abrupt change that any parametric systems exhibit for Pin approaching and exceeding $P_{th}$, the pAG technique needs fine-sweeps of $f_{in}$ or $P_{in}$ to facilitate the simulator's detection of any non-trivial periodic regimes. This approach is used herein to design the described SubHTs and to model operation for any investigated $f_{in}$ and $P_{in}$ values.

SubHTs for Identification

Each SubHT prototype described in this work can be described as a 2-port network connected to two antennas. Such a network includes a set of passive components attached to a varactor (see FIG. 2D). These components are responsible to define the range of the input spectrum wherein a period-doubling mechanism is activated by the received portion of the interrogation signal. As the present inventors have previously shown, the most convenient circuit topology granting the lowest possible SubHT's power threshold includes two circuit meshes populated by a set of at least five components, including the varactor used for time-modulation. The input mesh, that contains the receiving antenna, is designed to be series resonant for $f_{in}$ approaching the targeted interrogation frequency value and parallel resonant around $f_{in}/2$. The output mesh, instead, is designed to be series and parallel resonant around $f_{in}/2$ and $f_{in}^r$, respectively. It can be demonstrated that the activation of the SubHT's frequency divided output signal occurs for a $P_{in}$ value proportional to the square of the magnitude of the impedance at $f_{out}$ seen by the SubHT's central node towards the SubHT's output antenna (i.e., $|Z_{out}(f_{out})|^2$, see FIG. 3). When placing an acoustic resonator into the SubHT's output mesh, $|Z_{out}(f_{out})|^2$ becomes much higher within a narrow frequency range around the parallel resonance frequency of the adopted acoustic device. Consequently, the $P_{th}$ vs. $f_{in}$ trend exhibits a local maximum for $f_{in}=2f_a$, quickly decaying, as $f_{in}$ is made different from $2f_a$, with a sensitivity ($dP_{th}/df_{in}$) proportional to the square of the quality factor (Q) exhibited by $Z_{out}(f_{out})$. As Q can be exceptionally high when compared to the quality factor attained by conventional lumped or distributed EM resonators, incorporating an acoustic resonator in a SubHT inhibits the generation of the desired subharmonic output signal only for $f_{in}$ values equal or really close to twice the parallel resonance frequency of the adopted resonant device. Such a feature permits to create a unique signature in the frequency distribution of the SubHT's output power ($P_{out}$) vs. $f_{in}$, providing the fundamental means to implement an identification functionality. In fact, by embedding a set of acoustic resonators, with parallel resonance frequencies $f_a^{(1)}, f_a^{(2)}, \ldots, f_a^{(n)}$, into a SubHT's output network, this tag stops producing its output for $f_{in}$ values that are twice or almost twice every one of these resonances. Therefore, by remotely interrogating such a SubHT with a properly designed chirp signal with frequency varying in finite and engineered M steps, the SubHT does not generate its output signal during all the time frames wherein $f_{in}$ is equal or very close to $f_a^{(1)}, f_a^{(2)}, \ldots, f_a^{(n)}$ (see FIGS. 2A-2D). This allows to construct an M-bit UID code by simply encoding, with a 1 or a 0, the existence or the absence of the SubHT's output signal for each $f_{in}$ value spanned by the interrogation signal.

Furthermore, the high $dP_{th}/df_{in}$ sensitivity, proportional to $Q^2$, provides the fundamental means to achieve high EDC values by relying on chirp interrogation signals occupying a narrow bandwidth, as well as on sets of monolithic integrated acoustic resonators with resonance frequencies varying with hundreds of kHz steps. This can be verified by looking at the output spectrum of an ideal SubHT, driven by the same chirp interrogation signal, relying on the same architecture used in experiments, and considering a reasonable quality factor value (~80) for all the adopted inductors. Also, the operation of such an ideal SubHT can be investigated when relying on three different sets of properly sized acoustic resonators modelled through an MBVD equivalent circuit, each of which encoding a specific zero-bit of a 32-bit HID code. It is shown herein that up to 32 acoustic devices, with unique resonance frequencies separated by 250 kHz steps and with the electromechanical performance comparable to those of the commercial resonators used in this work, can be included in the SubHT's network (FIG. 3). This ensures a low power threshold (−20 dBm). Also, it makes it possible to encode any desired 32-bit UID code while using a chirp interrogation signal occupying a narrow bandwidth 16 MHz) that is compatible to what available for the existing UHF ISM bands. It is worth emphasizing that achieving a 250 kHz lithographic frequency resolution can be challenging when relying on UHF SAW resonators, like the 420 MHz ones used in connection with the prototypes described herein. Nevertheless, as experimentally demonstrated in, such a strict resolution can be achieved by relying on bulk acoustic wave (BAW) resonators exploiting quasi thickness-extensional (TE) modes of vibration, like the Two-Dimensional-Mode-Resonators (2DMRs) or the Two-Dimensional-Resonant-Rods (2DRRs) demonstrated by the present inventors. In fact, even though these devices are not usable to build delay elements for TDR-based PTs due to their modal characteristics inhibiting the lateral propagation of acoustic energy in not-metallized piezoelectric films, they exploit resonant modes of vibration with nearly one order of magnitude lower lateral group velocities than the resonant modes of vibration of SAWs excited in anyone of the available piezoelectric substrates. Such a key feature allows to fine tune such BAW devices' resonance frequency, lithographically, with steps that can be as low as 200 kHz, while relying on photolithographic tools with quite relaxed resolutions (~600 nm). Therefore, the adoption of BAW resonators on behalf of SAW resonators in future SubHTs for identification will provide the means to surpass the EDC of the state-of-the-art TDR-based ACO PTs, even enabling smaller forms factors because of the much larger resonators' capacitance per unit area.

Experimental Results

Figure 4:
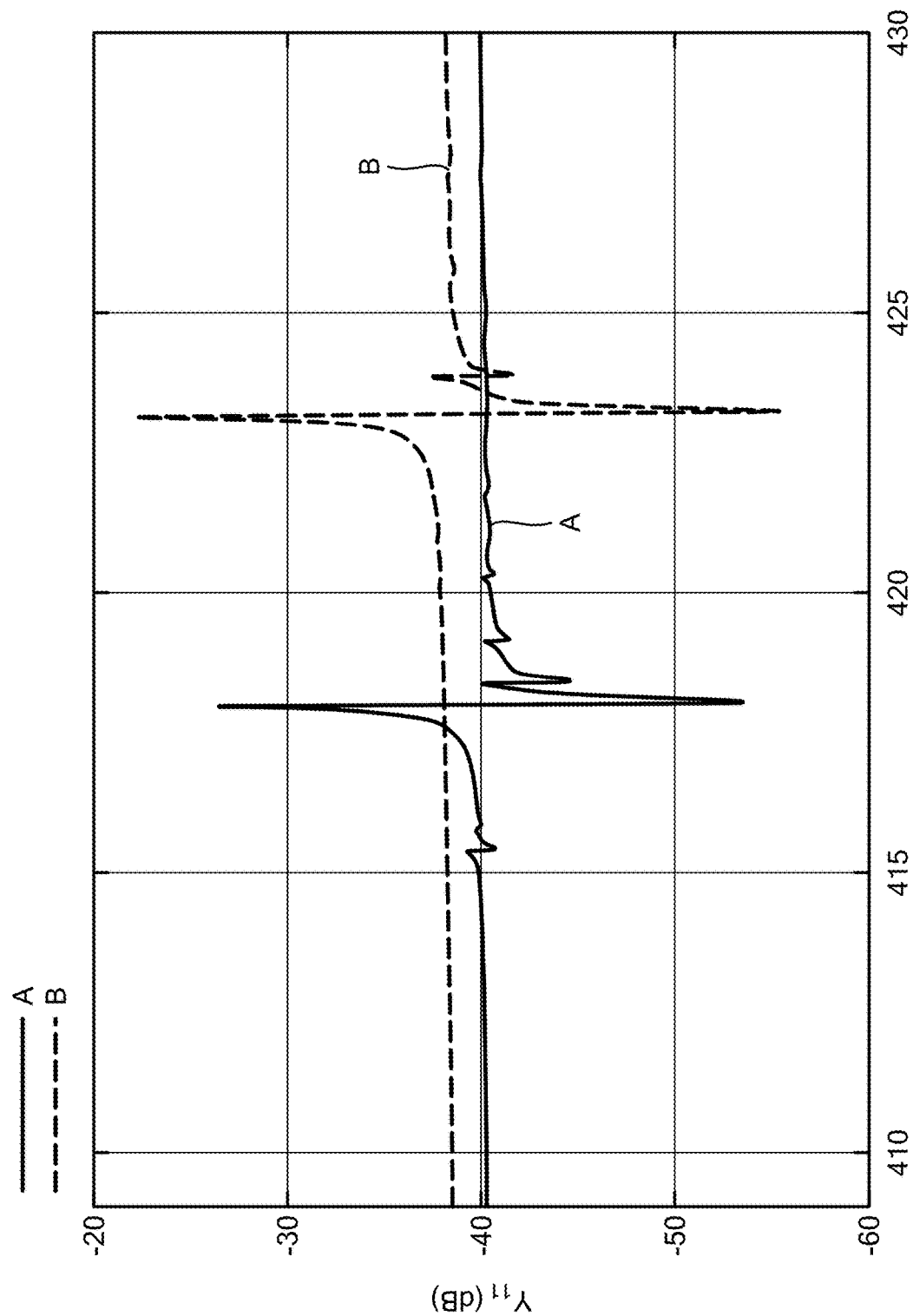
FIG. 4 illustrates measured admittance relative to the SAW devices (A and B) used by the SubHT prototypes described herein in accordance with various embodiments.

In order to demonstrate the unique identification functionality of the SubHT prototypes, a set of two temperature compensated commercially available SAW devices (dubbed as "A" and "B") were used. Before designing the SubHTs, the electromechanical performance of such selected devices was assessed from their admittance response, measured in a 2-port fashion through a Vector Network Analyzer (Keysight PNA N5221A). This was done after soldering each SAW device onto a dedicated printed-circuit-board (PCB) used for characterization. The measured admittances for the two SAW devices are shown in FIG. 4. Also, the measured parallel resonance frequency, the quality factor (Q), the capacitance ($C_0$) and the ($k_t^2$) exhibited by both devices are provided in Table I.

TABLE I

Measured electromechanical parameters for the SAW resonators used in this work.

| Parameter | Device A | Device B |
|---|---|---|
| $f_a$ (MHz) | 418.12 | 423.36 |
| $C_0$ (pF) | 2.35 | 2.5 |
| Q | 10,900 | 12,300 |
| $k_t^2$ (%) | 0.094 | 0.128 |

Following the selection of A and B, the design of the prototype SubHTs was finalized, including circuits and their PCB layout. As already mentioned, three prototypes were designed (dubbed as SubHT$^{(n/a)}$, SubHT$^{(A)}$, SubHT$^{(A,B)}$). This was done to verify the ability to encode different 32-bit UID codes through the adoption of different sets of SAW devices. In particular, SubHT$^{(n/a)}$ was designed not to include any SAW resonators, thus carrying a UID code exclusively formed by one-bits. Differently, SubHT$^{(A)}$ was designed to include A and, consequently, to have a UID code with only one zero-bit. Finally, SubHT$^{(A,B)}$ was designed to incorporate both A and B, corresponding to a UID code with two zero-bits. All the designed SubHT prototypes relied on the same circuit topology and on the same commercial lumped components, ensuring the lowest possible $P_{th}$ for a $f_{in}^t$ value of ~850 MHz when assuming the circuit to be terminated to two 50 Ω dipole antennas. First, a commercial hyperabrupt varactor (Skyworks SMV1405) was selected. Then, a circuit architecture, illustrated in FIG. 5A, was selected and optimized. The circuit is formed by: i) two LC notches, tuned around ~850 MHz and ~425 MHz; ii) one inductor (L3) in series to the varactor; iii) an impedance transformer made of a series capacitor and a shunt inductor and iv) the employed set of SAW devices for SubHT$^{(A)}$ and SubHT$^{(A,B)}$. It is worth emphasizing that the adoption of the transformer permits to reduce the electrical loading caused by the output antenna, thus enabling a lower $P_{th}$. The SubHTs' lumped component values, the PCB thickness and its main layout features were chosen based on a numerical optimization routine targeting the minimization of $P_{th}$. Such a routine relies on the $P_{th}$ closed form equation found in, which is expressed in terms of the linear impedances seen by the varactor at both $f_{in}^t$ and $f_{in}^t/2$. It is important to point out that the introduction of the PCB's layout features and thickness in the list of optimization parameters used by the simulator is critical to prevent design inaccuracies due to unmodelled board parasitics. Such parasitics, if neglected, can have a significant impact on the achievable performance. For this reason, they must be properly assessed during the design phase through a set of electromagnetic simulations. It is also important to point out that the same PCB thickness and the same layout were used for the three SubHTs described herein.

Figure 5A:
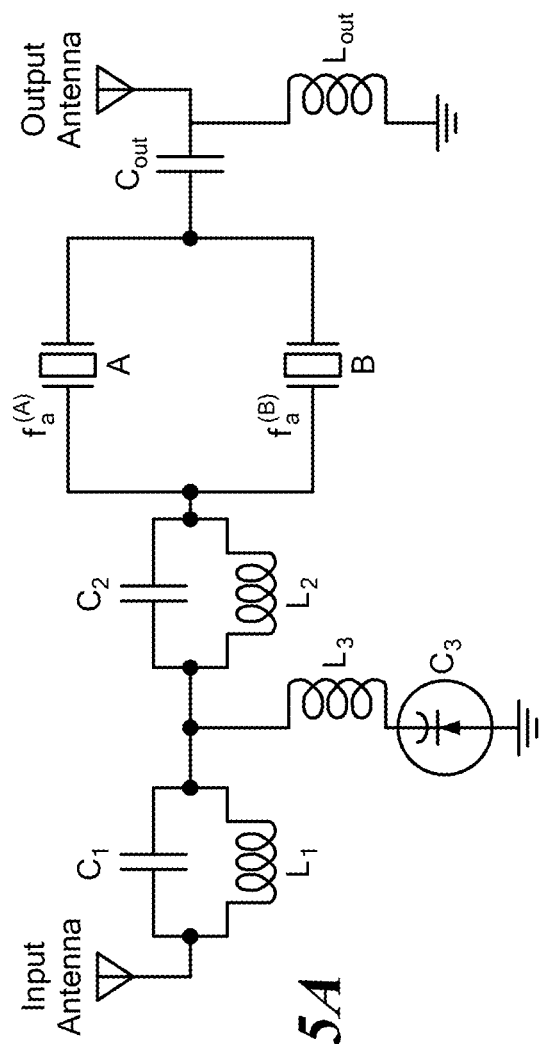
FIG. 5A is a circuit schematic of prototype SubHT$^{(A,B)}$ described herein in accordance with various embodiments.
Figure 5B:
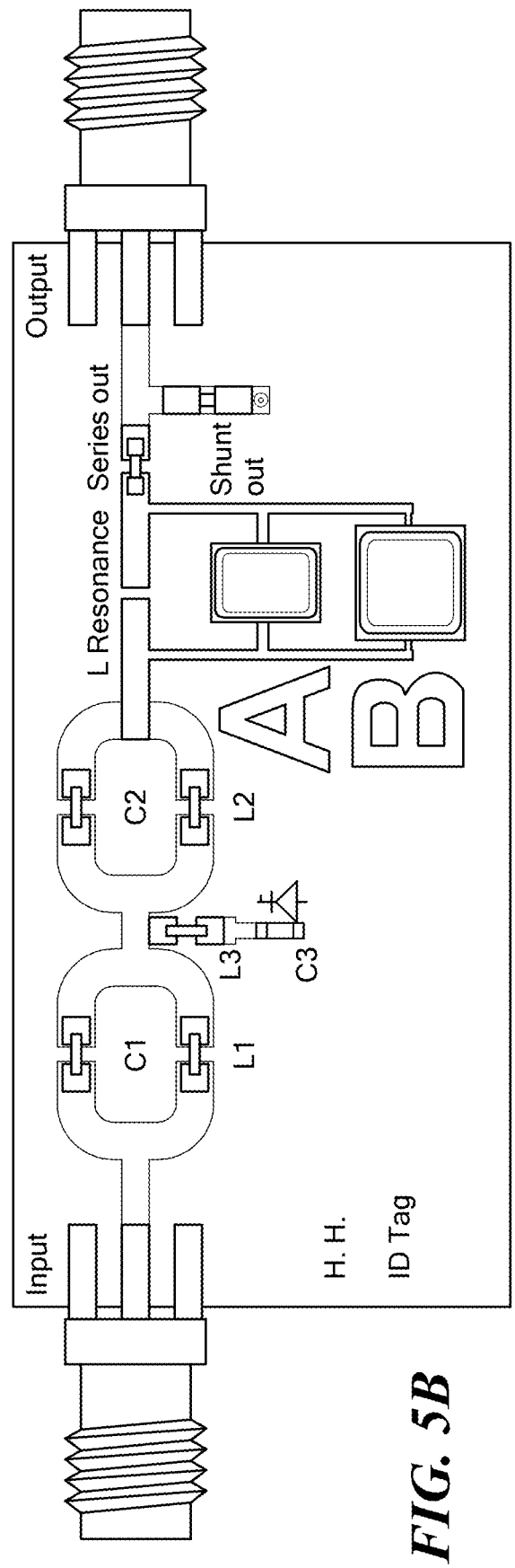
FIG. 5B is a picture of prototype SubHT$^{(A,B)}$ after fabrication. The selected components for all of the SubHT prototypes shown in FIGS. 3A-3C and described herein are $L_1$=51 nH (0603HP-51N), $L_2$=15 nH (0603HP-15N), $L_3$=16 nH (0603HP-16N), $L_{out}$=1 nH (0402DC-1N0), $C_1$=1.5 pF (GJM1555C1H1R5WB01), $C_2$=1.8 pF (GJM1555C1H1R8WB01), $C_3$ (Skyworks SMV1405), $C_{out}$=12 pF (GJM1555C1H120FB01)
Figure 6:
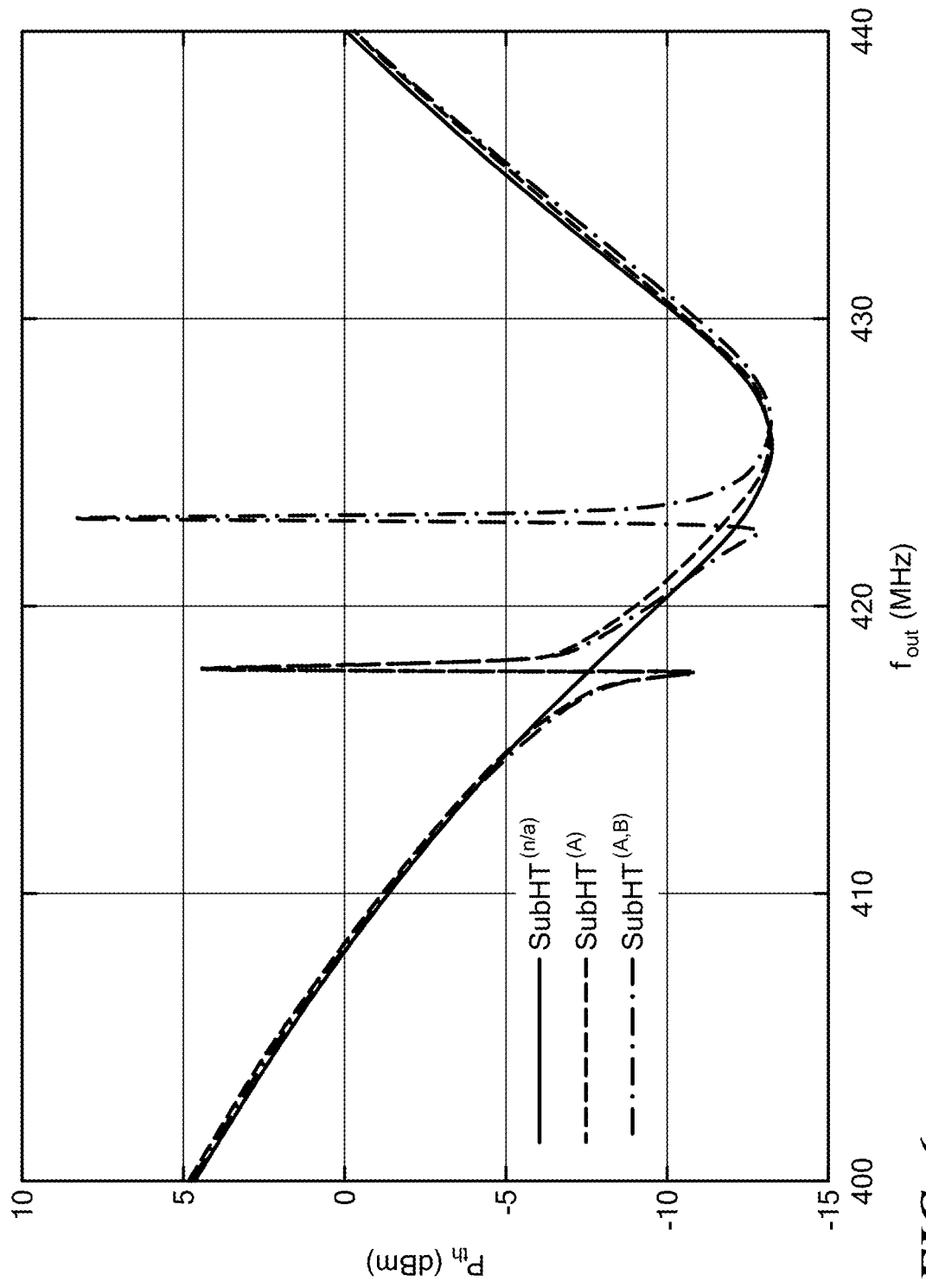
FIG. 6 illustrates a circuit simulated $P_{th}$ vs. $f_{out}$ distribution for the three designed SubHT prototypes. As shown, local $P_{th}$ maxima are generated at $f_{out}$ equal to $f_a^A$ for SubHT$^{(A)}$ and at $f_{out}$ equal to $f_a^A$ and $f_a^B$ for SubHT$^{(A,B)}$.
Figure 7A:
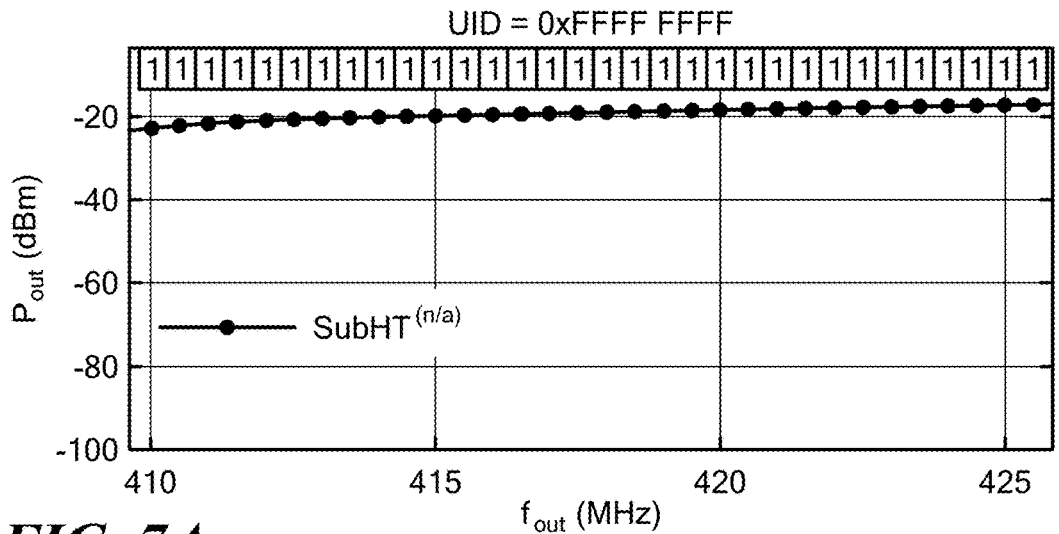
FIGS. 7A-7C illustrate a circuit simulated $P_{out}$ vs. $f_{out}$ distribution for each respective one of the three SubHT prototypes of FIGS. 3A-3C. The generated UID code of each prototype is displayed in hexadecimal.
Figure 7B:
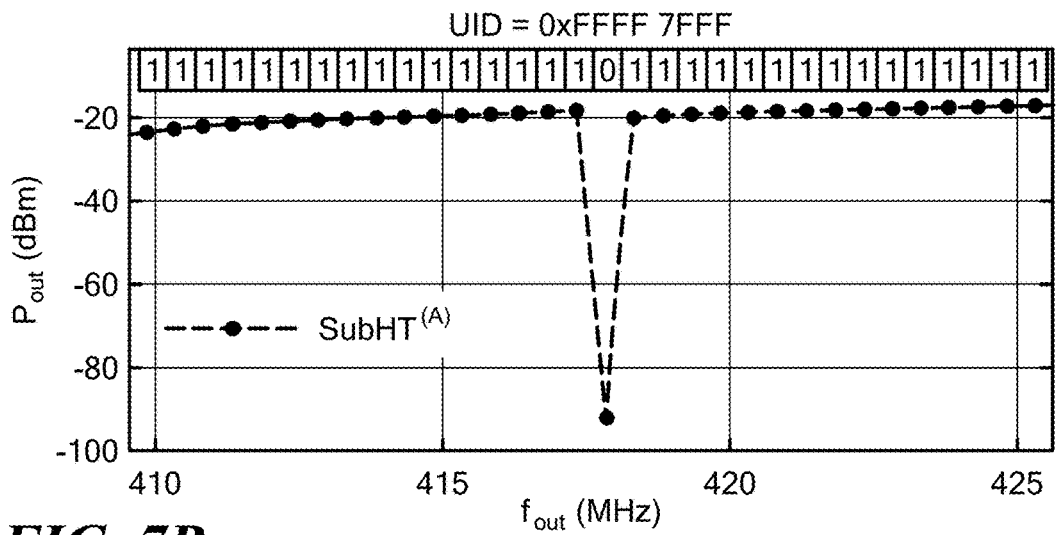
Figure 7C:
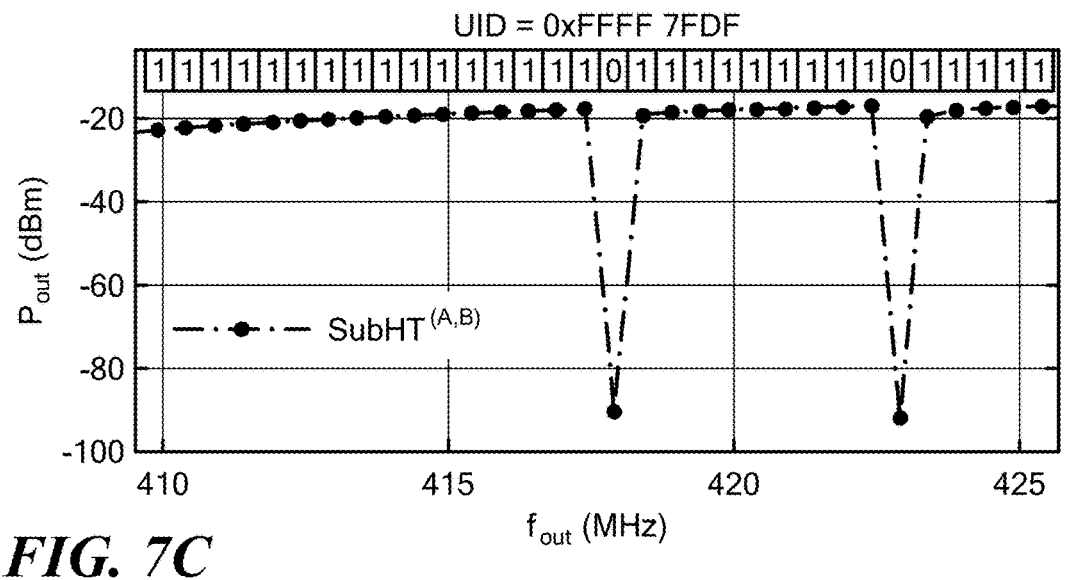
Figure 8:
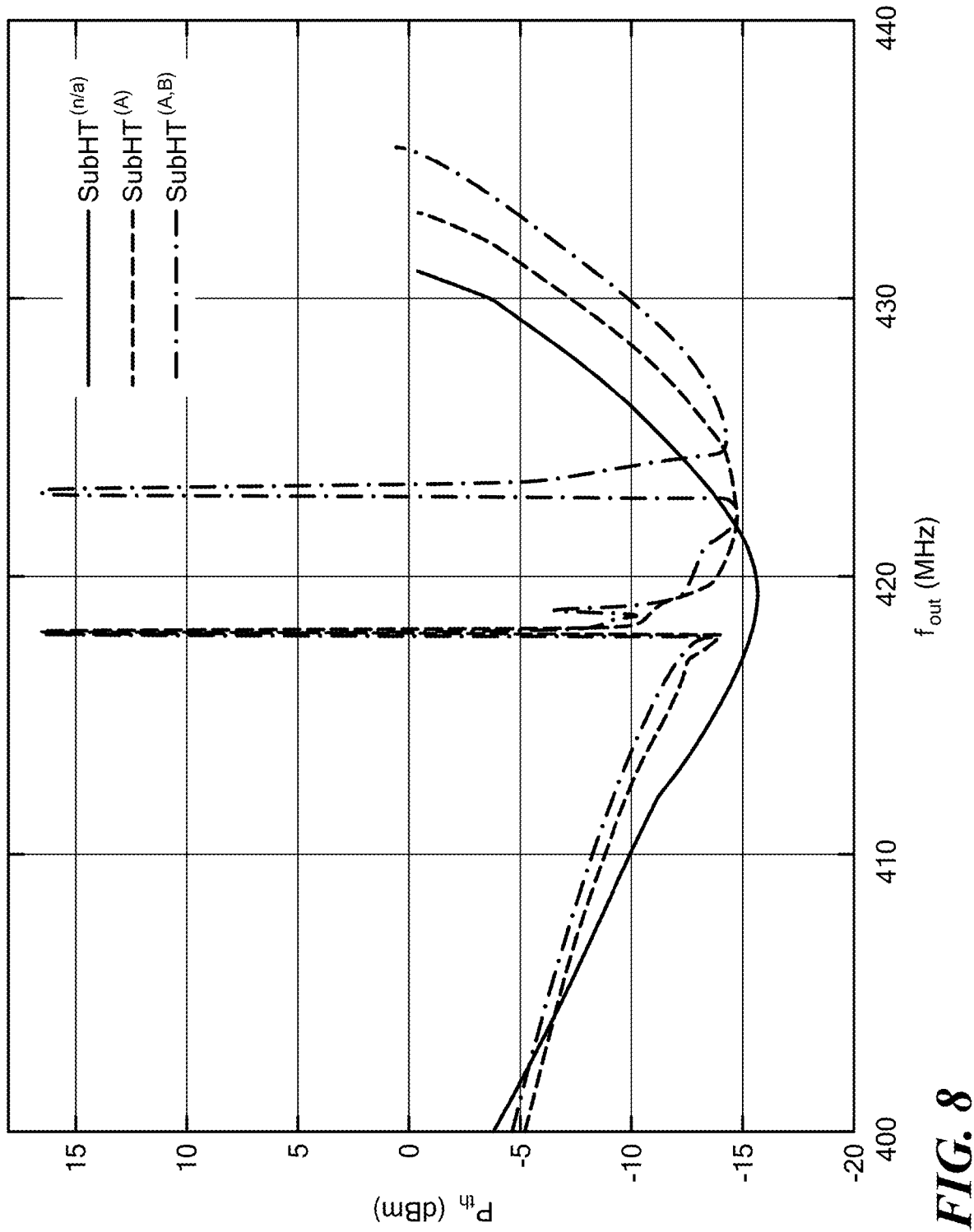
FIG. 8 illustrates $P_{th}$, vs. $f_{out}$ distribution for each of the three SubHT prototypes of FIGS. 3A-3C.
Figure 9A:
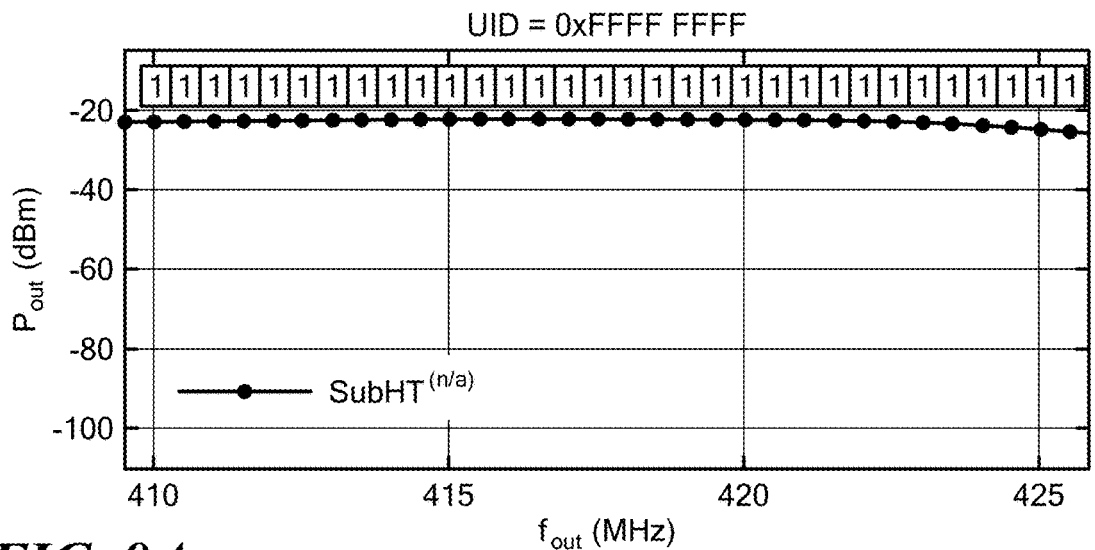
FIGS. 9A-9C illustrates a measured $P_{out}$ vs. $f_{out}$ distribution for each respective one of the three SubHT prototypes of FIGS. 3A-3C. The generated UID code of each prototype is displayed in hexadecimal.
Figure 9B:
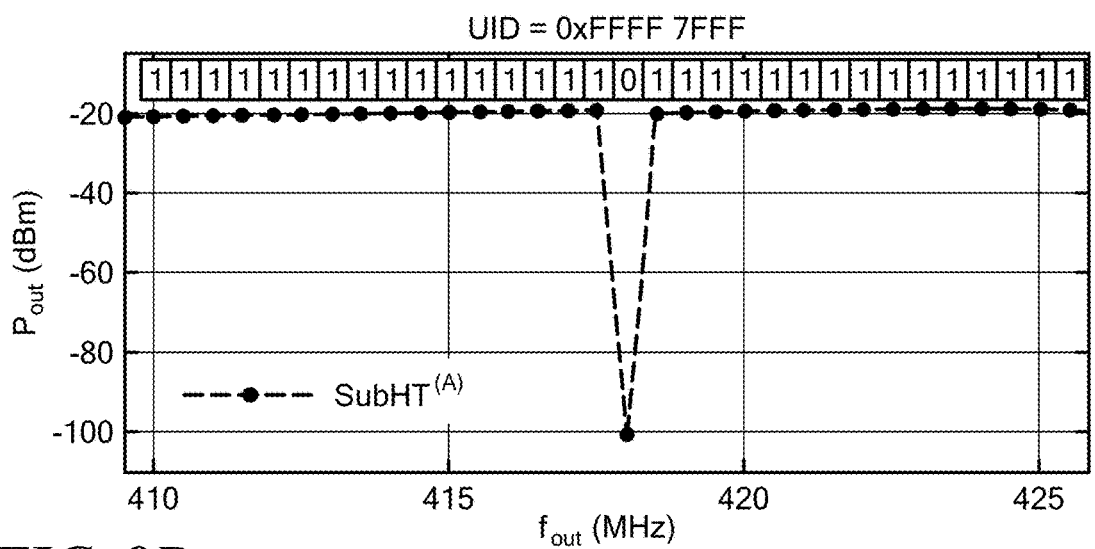
Figure 9C:
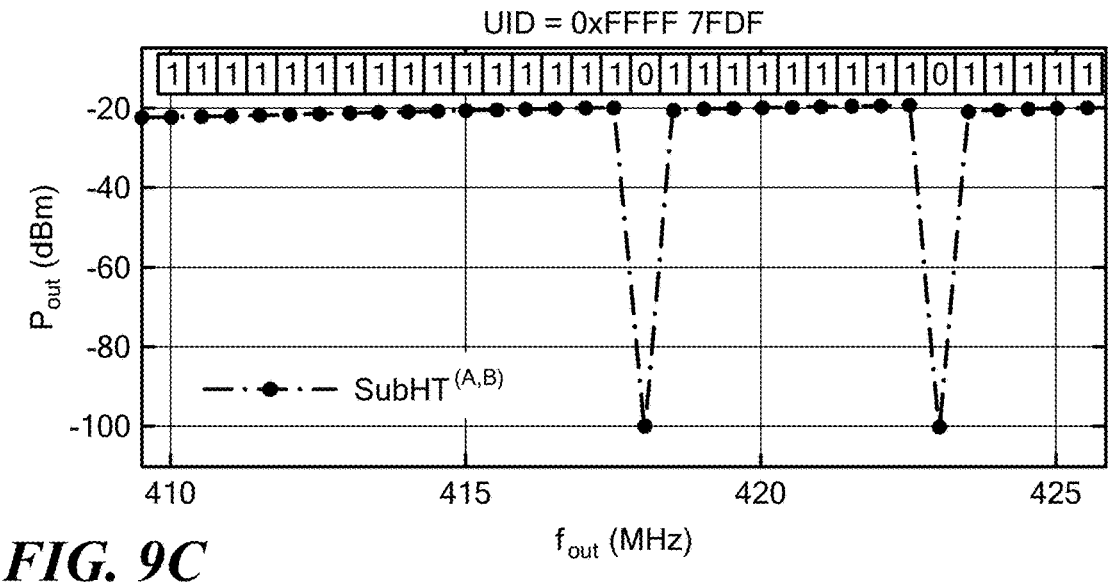

After finding the SubHTs' optimal design parameters based on the measured response of the employed SAW devices and on the scattering parameters of the selected lumped components, the unique spectral signatures generated in the simulated output response of SubHT$^{(A)}$ and SubHT$^{(A,B)}$ by each connected SAW resonator were identified. To do so, first the analytically found $P_{th}$ distribution vs. $f_{out}$ (FIG. 6) was analyzed relative to the designed SubHT prototypes (FIG. 5A). The trends shown in FIG. 6 clearly show local $P_{th}$ maxima at four values corresponding to the parallel resonance frequencies of the connected SAW devices for SubHT$^{(A)}$ and SubHT$^{(A,B)}$ and no maxima for SubHT$^{(n/a)}$. In particular, the maxima identified for SubHT$^{(A)}$ and SubHT$^{(A,B)}$ are important as they identify the only $f_{in}$ values (i.e., $2f_a^{(A)}$, $2f_a^{(B)}$) corresponding to zero-bits in the SubHT's UID code. Later, the frequency selectivity in the output response relative to all the designed SubHT prototypes was confirmed by extracting the corresponding $P_{out}$ vs. $f_{out}$ trends (FIG. 7) for a fixed input power level ($P_t$). This was done through a pAG-based HB circuit simulation. During this simulation, the value of $P_t$ (i.e., −8 dBm) was chosen to be slightly higher than the maximum $P_{th}$ value for $f_{in}$ values ranging from 820 MHz to 852 MHz, not considering any $f_{in}$ values equal to or approaching $2f_a^{(A)}$ or $2f_a^{(B)}$. As evident from FIG. 7, simulated negligible $P_{out}$ levels were only found in SubHT$^{(A)}$/SubHT$^{(A,B)}$ for $f_{out}$ values closely matching $f_a^{(A)}/f_a^{(A)}$, $f_a^{(b)}$, confirming analytical expectations in FIG. 6. Finally, the designed SubHT prototypes were assembled and tested through conventional RF characterization tools. A picture of one of the fabricated SubHT prototypes SubHT$^{(A,B)}$) is illustrated in FIG. 5B, showing: i) A and B; ii) the selected surface mount components and iii) the two SMA connectors used to drive and probe SubHT$^{(A,B)}$ during its testing. The component values and model numbers relative to all the selected surface mount components are listed in the caption of FIG. 5B. The measured response of the three built SubHT prototypes was characterized through a wired experiment, aiming at extracting their measured $P_{th}$ vs. $f_{out}$ and $P_{out}$ vs. $f_{out}$ trends. In order to do so, the input ports were driven with a chirp interrogation signal with the same frequency bounds considered during the simulation (FIGS. 6, 7A-7C), identifying through a spectrum analyzer (Keysight E4402B), for each swept $f_{in}$, the corresponding $P_{th}$ (FIG. 8) and $P_{out}$ (FIG. 9) values. During the extraction of the measured $P_{out}$ vs. $f_{out}$, a fixed input power level was considered, equal to the value (i.e., $P_t$) used during the extraction of the simulated $P_{out}$ vs. $f_{out}$ trends (FIG. 9). As expected, local maxima or minima were found in both the measured $P_{th}$ vs. $f_{out}$ and $P_{out}$ vs. $f_{out}$ trends only for SubHT$^{(A)}$ and SubHT$^{(A,B)}$. These notches are set by the resonance frequency of the connected SAW devices. Also, a good matching between simulations (FIGS. 6-7) and the measured $P_{th}$ and $P_{out}$ trends (FIGS. 8-9) was found. The different $P_{out}$ spectral characteristic achieved by the described SubHTs proves that different UID codes can indeed be obtained by relying on different sets of SAW devices.

Figure 10A:
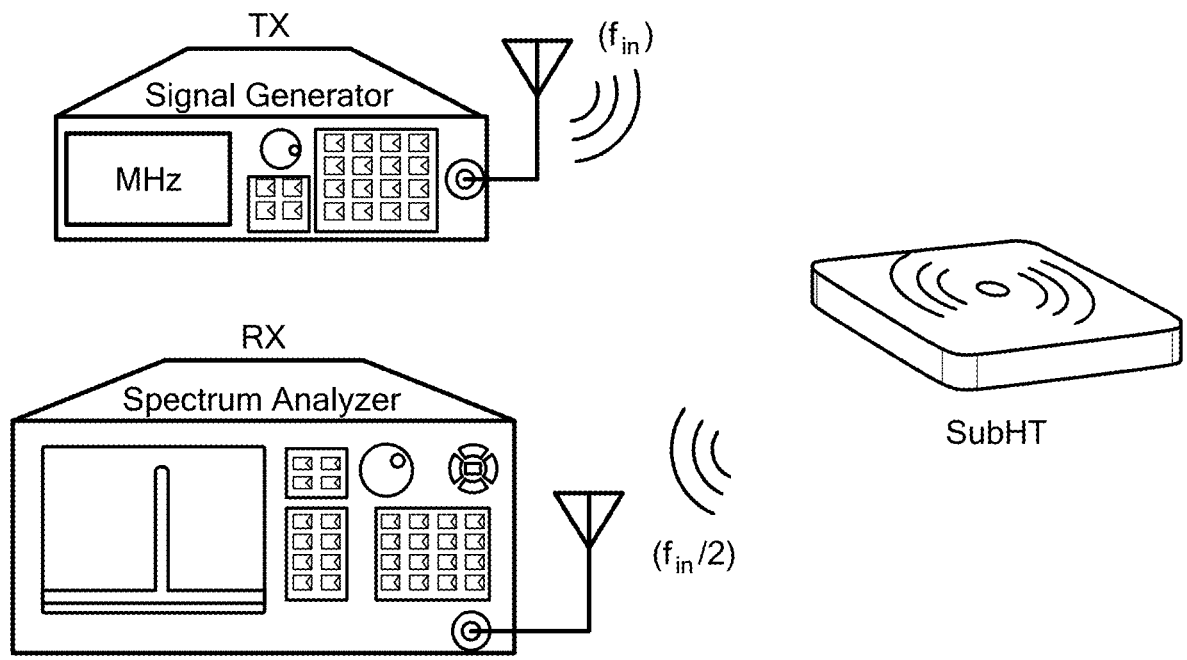
FIG. 10A illustrates an experimental setup used to perform wireless measurement of SubHT$^{(A,B)}$.
Figure 10B:
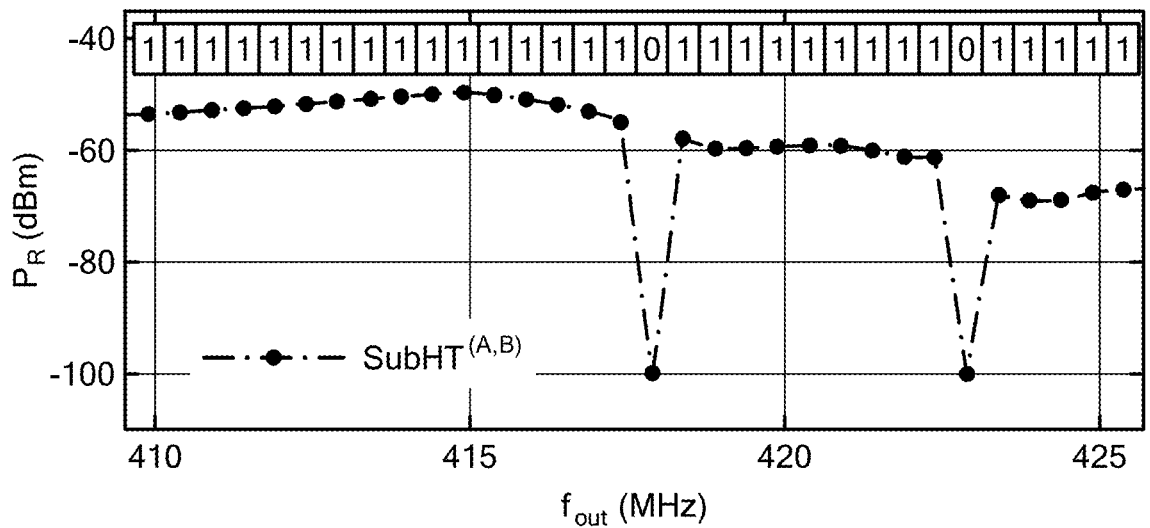
FIG. 10B illustrates a measured trend of $P_R$ vs. $f_{out}$ relative to SubHT$^{(A,B)}$, when assuming $f_{in}$, to vary between 820 MHz and 852 MHz.

Ultimately, a wireless characterization was selected. During this characterization one of the built SubHT prototypes (SubHT$^{(A,B)}$) was arbitrarily selected. This SubHT was simultaneously connected to two commercial dipole antennas (ANT-916-CW-RCS and ANT-433-CW-QW-SMA, with antenna gain equal to ~3 dB) exhibiting ~50Ω input impedances at $f_{in}^t$ and $f_{in}^t/2$ respectively. Also an antenna was attached, identical to the one operating at $f_{in}^t$ and connected at the SubHT's input port, to the output of a commercial power amplifier used to boost the maximum output power level of the signal generator (Tektronix TSG4100A) producing the chirp interrogation signal. This allowed emulation of the functionalities of the transmit module (TX) of an IoT reader, radiating a chirp signal with a fixed output power level ($P_{tx}$, ~23 dBm) along the most favorable antenna direction. The receive module (RX) of the same IoT reader was emulated by relying on the spectrum analyzer used during the wired characterization. Accordingly, an identical antenna to the one operating at ~$f_{in}^t/2$ was selected and connected to the output port of SubHT$^{(A,B)}$. Such antenna was connected to the spectrum analyzer's output port, making it able to remotely receive any subharmonic signals produced by SubHT$^{(A,B)}$. The spectrum analyzer and the signal generator used during the wireless test were placed close to each other so as to match, as closely as possible, the frequent operational scenario wherein the reader's TX and RX are in close proximity to each other (as shown in FIG. 10A). Both tools were then placed in an uncontrolled electromagnetic environment (the inventors' lab at the fourth floor of the Interdisciplinary Science and Engineering Complex at Northeastern University), at a 2.5 meters distance (i.e., d=$d_{max}$=2.5 m) from SubHT$^{(A,B)}$. Finally, the trend of the portion of $P_{out}$ ($P_R$, see FIG. 10B) received by the equivalent RX module vs. the chirped interrogation frequency was measured. This trend demonstrates that a far-field reading of any UID codes carried by SubHTs used for identification is indeed possible. It is worth clarifying that $d_{max}$ represents the maximum interrogation range enabled by the SubHT prototype, given the electromagnetic performance of the selected antennas. Clearly, the adoption of transmitted power levels reaching the maximum usable value, based on ITU regulations, as well as the adoption of higher gain antennas, like the ones typically used in readers' TX modules for harmonic radar applications, will allow to achieve $d_{max}$ values significantly higher than 2.5 meter. Furthermore, tailoring the SAW design to enhance the performance of SubHTs for identification will also be key to maximize the achievable interrogation range.

Three-Resonator Prototype

The present technology provides a new class of passive identification subharmonic tags (SubHTs) for far-field sensing. The exemplary prototypes described herein more specifically provide a new class of Ultra-High-Frequency (UHF) MEMS-based passive identification subharmonic tags (SubHTs) for far-field sensing. The prototypes leverage the combined dynamics of high-Q X-cut lithium niobate (LN) acoustic MEMS resonators and those of solid-state components to enable a long-range passive identification functionality without requiring any active components or any ad-hoc memory devices. The resonators can have resonant frequencies in the UHF band, i.e., 300 MHz to 3 GHz. A prototype is demonstrated, which can extend the use of SubHTs even to large deployments of wireless sensor nodes (WSNs), each of which can distinguish data coming from a plethora of other devices.

Although described herein and prototyped for operation in UHF, in some embodiments, the SubHTs and resonators can be configured to operate at any other suitable range or band of frequencies. Furthermore, although described herein and prototyped as using lithium niobate (LN) acoustic MEMS resonators, resonators including any other suitable piezoelectric material can be used, including, for example, $LiNbO_3$, AlScN, AlCrN, PZT, $LiTaO_3$, GaN, AlN, any other suitable piezoelectric material, or combinations thereof. In addition, although prototyped as MEMS resonators, the resonators can also be formed into or onto any other suitable structure. In various embodiments, for example, the resonators can be built directly on a silicon wafer in an array or built/configured in any other suitable arrangement on (or in) any other suitable structure.

In the present technology, a novel acoustic-based subharmonic tag (SubHT) is provided relying on a network of X-cut LN microacoustic resonators to respond to a chirped interrogation signal with a sequence of passively generated subharmonic signals, each having an instantaneous frequency set by the resonance frequency of a dedicated resonator. When triggered by such a frequency ramping interrogating signal, the present SubHT generates and radiates an output signal only during those time frames wherein the interrogation frequency is twice or nearly twice the resonance frequency ($f_1$, $f_2$, $f_3$, . . . , $f_n$) of the included resonant devices (see FIG. 1B). As such, the SubHT's output signal has an instantaneous frequency almost discretely varying among $f_1$, $f_2$, $f_3$, . . . , and $f_n$. Such a radiated pool of frequencies can be used as a code for identifying any monitored WSNs.

Figure 11A:
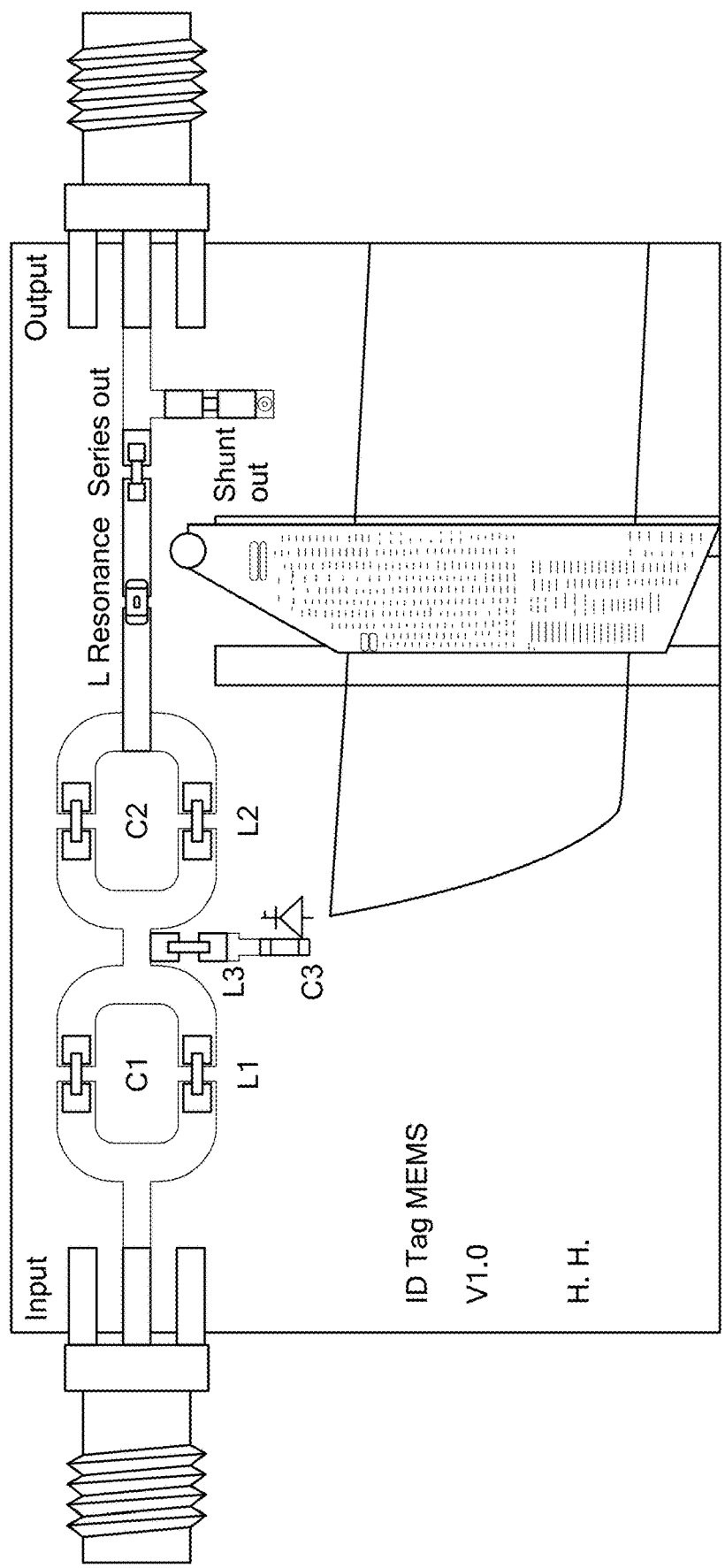
FIG. 11A is a picture of another prototype SubHT having fabricated Lithium Niobate (LiNbO$_3$, hereinafter LN) resonators connected to a PCB board through wire-bonding.
Figure 11B:
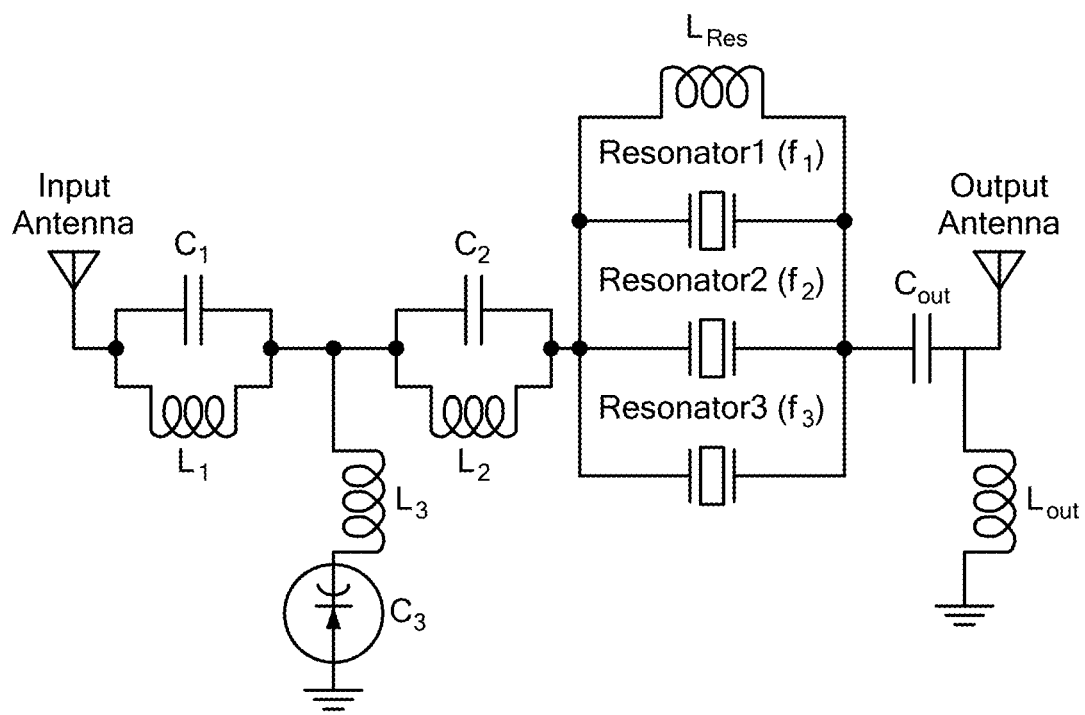
FIG. 11B is a schematic diagram of the SubHT of FIG. 11A.
Figure 12:
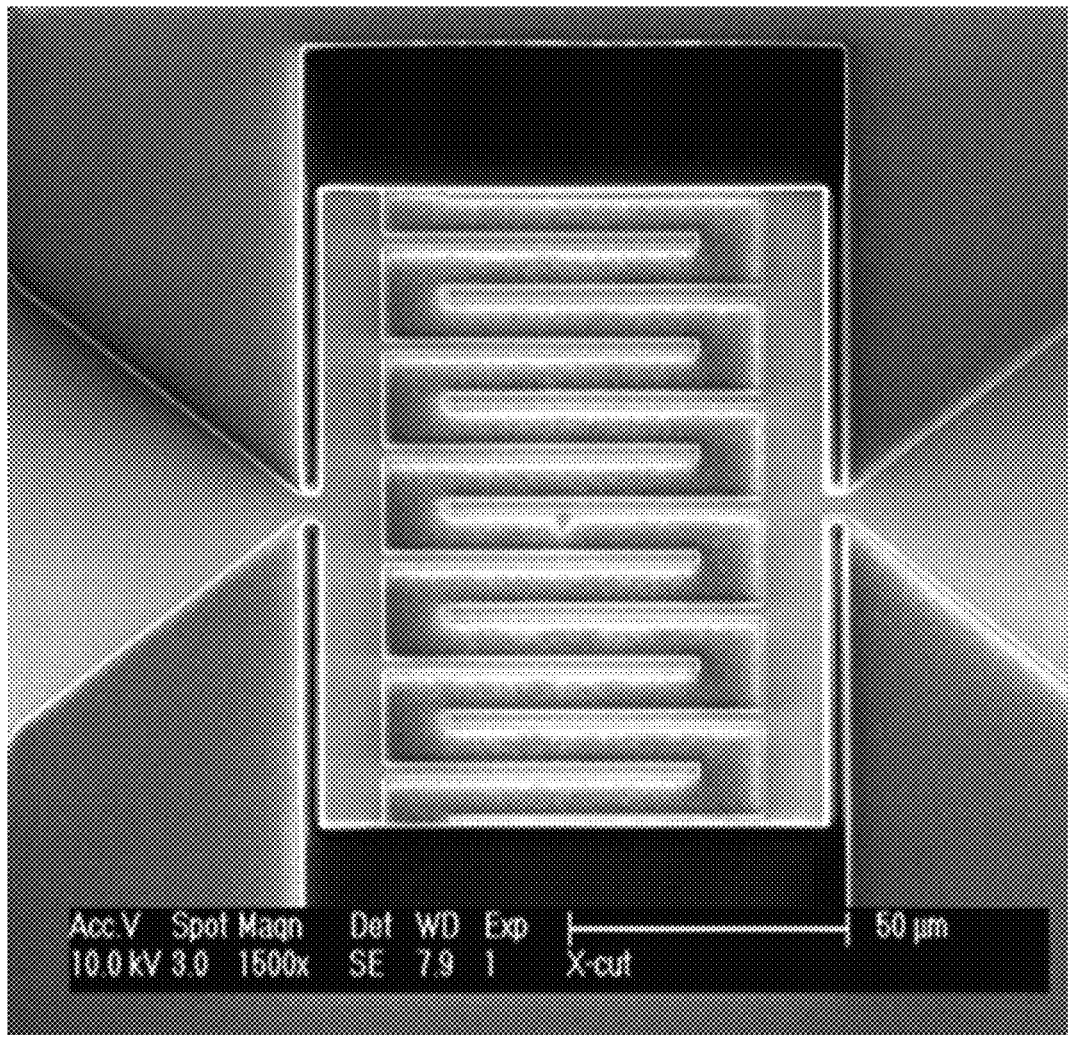
FIG. 12 is a scanning electron microscope (SEM) image of the fabricated SubHT prototype of FIG. 11A.
Figure 14:
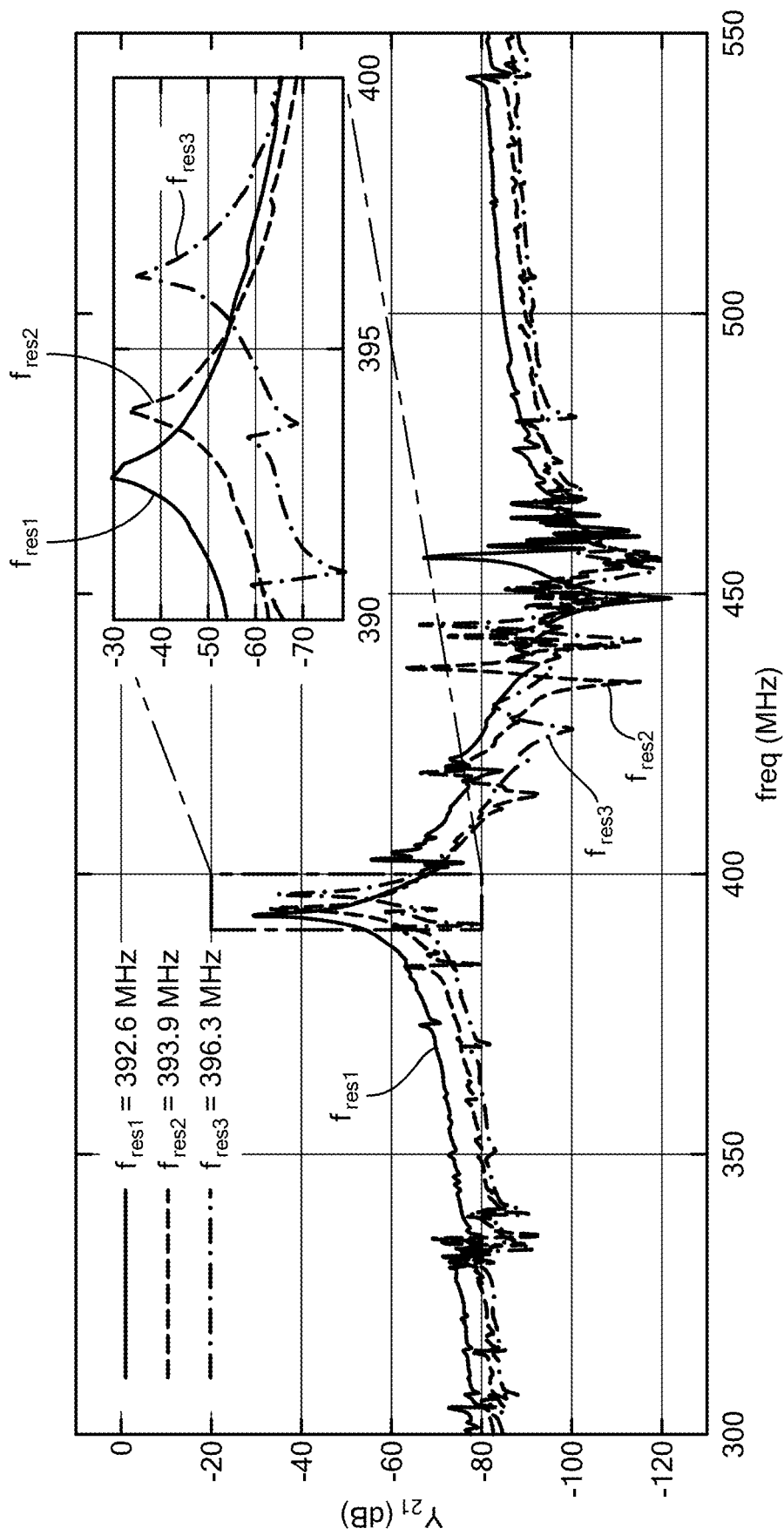
FIG. 14 illustrates a $Y_{21}$ admittance response of the three LN resonators implemented in the fabricated prototype SubHT of FIG. 11A.
Figure 15:
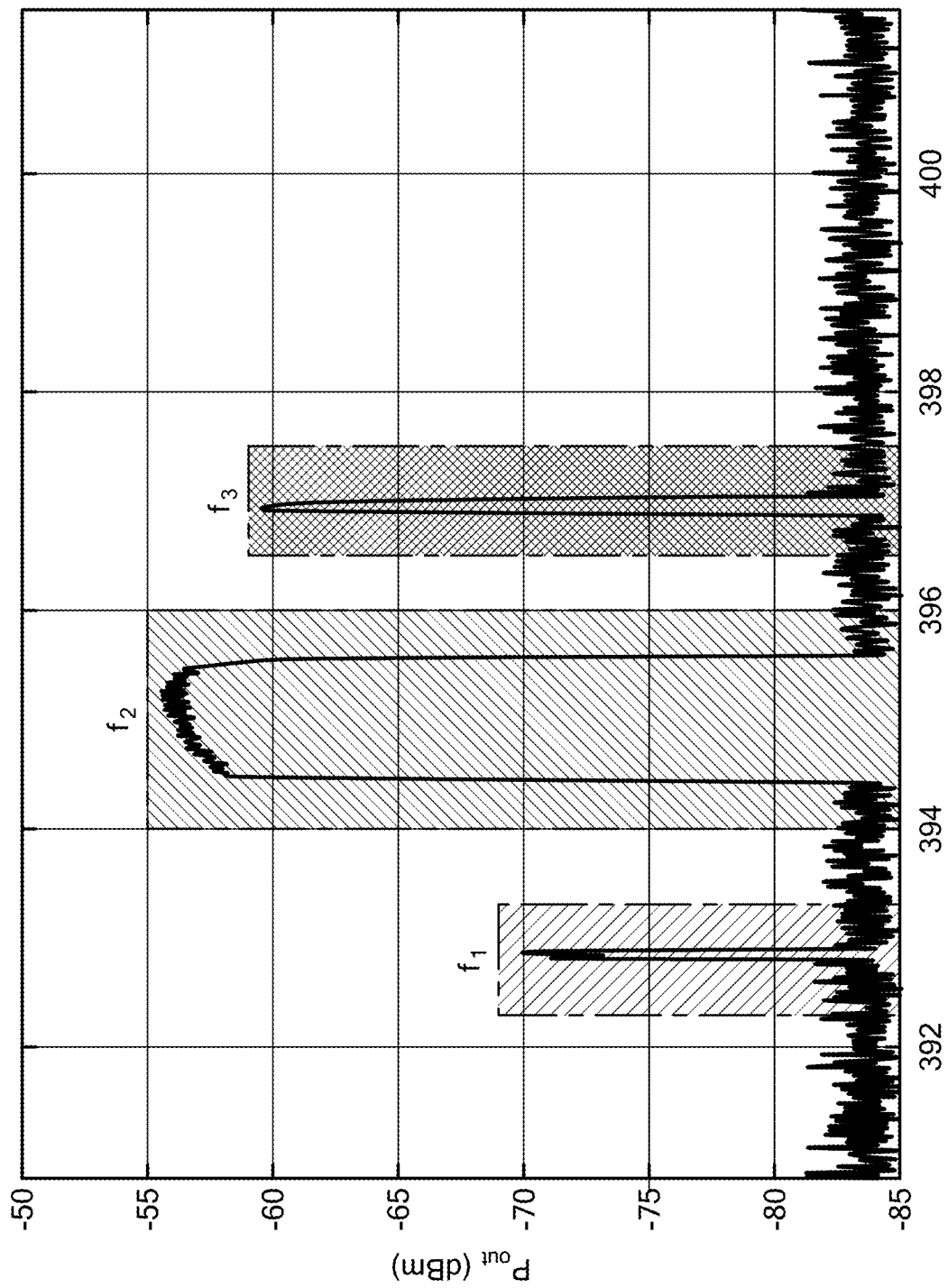
FIG. 15 illustrates a measured, radiated $P_{out}$ of the prototype SubHT of FIG. 11A when remotely interrogated with an interrogation frequency ranging from 784 MHz to 800 MHz and when recording the response over the entire interrogation time frame. The three subharmonic signals are centered around the three resonance frequencies ($f_1$, $f_2$ and $f_3$) of the set of embodied LN microacoustic resonators.

The fabricated SubHT prototype is shown in FIG. 11A and a corresponding circuit diagram of the SubHT prototype is provided in FIG. 11B. A scanning electron microscope (SEM) image of the fabricated SubHT prototype is shown in FIG. 12. The prototype circuit was built using off-the-shelf passive components and three fabricated lithium niobate (LN) resonators with resonance frequencies ($f_1$, $f_2$, and $f_3$) equal to 392.6 MHz, 393.9 MHz and 396.6 MHz (as shown in FIG. 14).

Figure 13A:
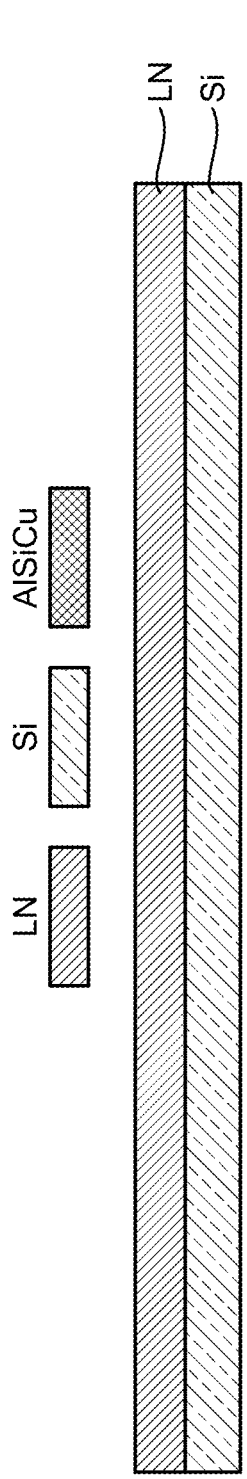
FIGS. 13A-13D illustrate a process flow for the fabrication of X-cut LN microacoustic resonators in accordance with various embodiments. Such X-cut LN microacoustic resonators can operate at any designed frequency, including, for example, about 395 MHz as with the prototype SubHT of FIG. 11A. However, such techniques can be used to form any suitable type of resonator in accordance with various embodiments, including, for example, acoustic, microacoustic, or electromagnetic resonators including any suitable piezoelectric material including, for example, any of LiNbO$_3$, AlScN, AlCrN, PZT, LiTaO$_3$, GaN, AlN, or combinations thereof.
Figure 13B:
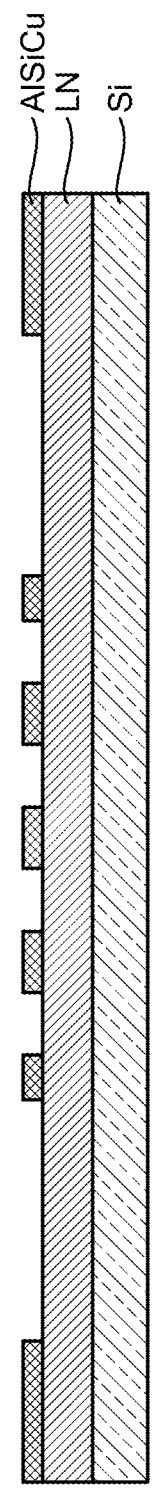
Figure 13C:
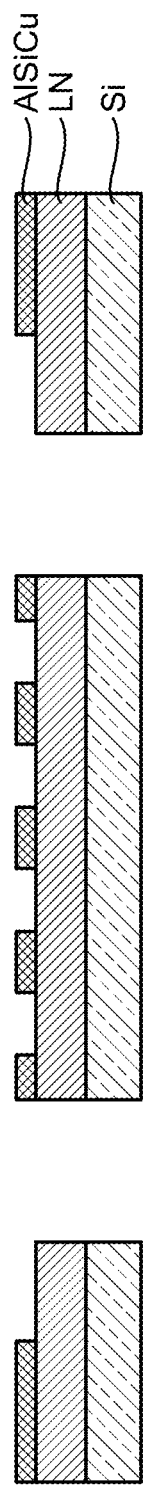
Figure 13D:
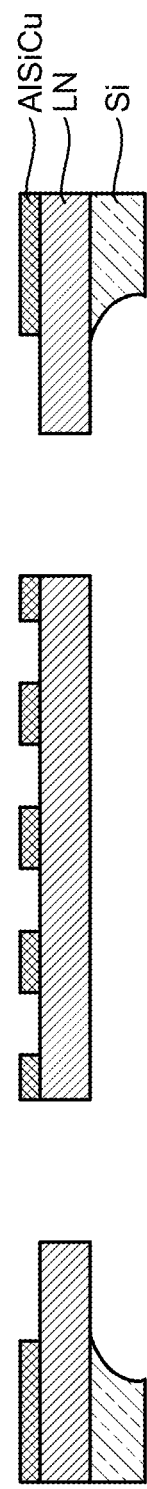

The LN resonators of the prototype were each fabricated according to the exemplary methodology illustrated in FIGS. 13A-13D, although any suitable fabrication methodology can be used in accordance with various embodiments. As shown in FIG. 13A, the LN was disposed over a silicon (Si) substrate. Then, as shown in FIG. 13B, aluminum silicon copper (AlSiCu) alloy was patterned onto the LN to provide structural reinforcement, drive response frequency, and define resonator structures. As shown in FIGS. 13C and 13D, the LN and Si substrate are each partially etched away to suspend the patterned LN resonant structures, thereby permitting the resonant structures to vibrate and deform when responsively driven by a signal.

The prototype SubHT was designed for a minimum sensitivity of −9 dBm around 790 MHz. To demonstrate the SubHT's remote ability to radiate a unique identifier set by $f_1$, $f_2$ and $f_3$, over a far-field range, two antennas at the SubHT's were connected at the input and output ports. Then, the SubHT was remotely interrogated with a −9 dBm signal produced by a signal generator and characterized by a frequency varying between 784 MHZ and 800 MHz. Finally, a spectrum analyzer was placed at 4.5 meters from the SubHT to receive any signals radiated by the SubHT and memorize the instantaneous distribution of the SubHT's output power ($P_{out}$) vs. its interrogation frequency. As evident from 15, during the entire duration of the interrogation frame, the SubHT shows a non-negligible $P_{out}$ only for those interrogation frequencies corresponding to $2f_1$, $2f_2$ and $2f_3$, demonstrating the ability to achieve the desired identification functionality without the need of any memory devices or any active circuits.

Conclusion

Presented herein are the first passive subharmonic tags (SubHTs) for far-field sensing and identification. Prototypes are discussed herein wherein UHF FDR-based SubHTs were employed using SAW resonators to enable a passive and far-field identification but the SubHTs described herein are not so limited as discussed above. The SubHT architecture described herein advantageously operates within available bandwidths allocated to the existing IoT services, unlike previous proposed solutions, which require ultra-wideband (UWB) interrogation signals incompatible with the available IoT services bandwidths. Moreover, thanks to the high frequency selectivity exhibited by its acoustic resonant devices and thanks to its time-modulated dynamics, the SubHTs discussed in this work can encode different Unique Identifiers (UID) codes directly in the frequency domain, providing fundamental means to identify any items from a far-field distance not limited by electromagnetic clutter, readers' self-interference and multi-path and without requiring any batteries or any power hungry non-volatile memory devices. The results described and illustrated herein open exciting scenarios towards the use of SubHTs for logistics and tracking, as well as in future massively deployed wireless sensor networks.

The present technology provides fundamental and previously unknown means to achieve a passive far-field identification functionality using subharmonic tags (SubHTs). This identification functionality is fundamental for any readers to be able to discriminate the information coming from a plethora of wireless remote sensors, thus enabling use of massive information to increase the amount of sensed data and facilitate any related decision making. In the past, identification has been achieved by using active components requiring batteries, thus posing a constraint on the maximum lifetime of any wireless sensor node featured with such identification functionality. Alternatively, Surface Acoustic Wave identification tags have been proposed. Yet, the use of these tags heavily enhances the complexity of the readers' design, even posing a constraint on the maximum achievable sensing range that can be attained. The development of SubHTs equipped with an identification functionality (derived, for example, from the combination of 2, 3, 4, 5, 6, 7, 8, 9, 10, or more resonators having different resonant frequencies in the UHF band) ultimately renders SubHTs suitable for the widespread deployments of the future Wireless Sensor Nodes foreseen in many application frameworks within the Internet of Things (IoT). Also, it provides access to a Wireless Sensing Tag technology able to: i) provide an extraordinarily high sensitivity; ii) completely mitigate all the problems of self-interference affecting the existing counterparts; iii) attain exceptional sensing performance without requiring any batteries. This is particularly important to null the maintenance costs linked to the replacement of batteries, whose economic impact is unbearable whenever trying to deploy thousands of wireless sensor nodes to address the needs of the expanding IoT.

The tag of the present technology leverages the unique dynamics of SubHTs to respond to an interrogation signal with a time varying frequency with a sequence of continuous wave signals with frequency univocally set by the resonance frequency of a set of resonators included in their network. As a result, by extracting the instantaneous frequency of the SubHTs' output signal during the entire interrogation time frame, it is possible to retrieve the resonance frequency of each adopted resonator. By relying on resonator technologies where the resonance frequency can be chosen by design, it is possible to construct each SubHT such that its response to the same interrogation signal can include a sequence of signals characterized by different frequencies, hence providing the required means to identify any SubHTs in a wireless sensor network at any time.

The present technology has at least the following novel features.
1. It permits far-field identification without requiring any batteries.
2. It is agnostic with respect to the type of resonators used to generate the "identification code", even though the demonstrated prototype is made of microacoustic resonators.
3. It permits leveraging of the exceptional and documented performance of SubHTs even in widespread sensor deployments, generating the means to sense perpetually any parameters of interests.

The present technology has at least the following advantages over prior technologies.
1. It has the ability to carry out far-field identification without requiring any batteries. This permits complete elimination of the significant costs associated with battery replacements in the existing IoT wireless sensor nodes. The technology can work perpetually without need of battery replacement.
2. It allows extending the use of SubHTs to massive and widespread sensor deployments, such as those required by emerging IoT applications.
3. The identification mechanism and its reliability are not affected by any type of self-interference, improving the sensing accuracy, and relaxing the design and complexity of the complementary readers.
4. The technology requires only printed and flexible electronics. That is, the SubHT does not need to be mounted on a conventional PCB or other bulkier, more rigid substrate.
5. The technology permits identification features that cannot be achieved by any competing technology.

The technology has at least the following uses.
1. It can be used for identification and labeling of any commercial items.
2. When the SubHT also embodies a sensor, it permits achieving the full functionalities of a wireless sensor node, without requiring any batteries.
3. It can be used to prevent counterfeiting of commercial goods, preventing serious economic consequences that, in many cases, threaten the safety and healthiness of food and drugs for consumers.

Provided herein are a new class of subharmonic tags (SubHTs) which use a set of resonators such as, for example, acoustic resonators, microacoustic resonators, electromagnetic resonators, or combinations thereof, including, for example, surface acoustic wave resonators, bulk acoustic wave resonators, any other resonator using surface acoustic or bulk acoustic technologies, or combinations thereof, to address a remote identification functionality directly in the frequency domain, while employing narrowband interrogation signals to ensure 32-bits or higher encoding data capacities (EDCs). The SubHT prototypes leverage the dynamics of high quality factor (Q) SAW resonators, combined with those of time-modulated solid-state components, to enable a far-field passive identification without requiring any batteries, any active components or any ad-hoc memory devices. Through the demonstration of the SubHT prototypes described herein, a new path towards the adoption of SubHTs for logistics and tracking has been unveil, as well as in future massive deployments of wireless sensor nodes (WSNs). Even more, the SubHTs discussed in this work provide their readers with an unprecedented immunity to electromagnetic clutter, multi-path and self-interference, creating unique means to identify any items from a far-field distance, even in indoor uncontrolled electromagnetic environments.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A subharmonic tag for passive far-field sensing comprising:
   at least one antenna disposed at a corresponding port, wherein each at least one antenna is configured as an input antenna, an output antenna, or an input/output antenna, the subharmonic tag configured, via the at least one antenna, to receive an interrogation signal having a plurality of interrogation frequencies;
   a passive LTI network in electrical communication with the at least one antenna; and
   two or more resonators in electrical communication with the passive LTI network, each resonator having a different resonant frequency and a corresponding trigger frequency, the corresponding trigger frequency being different than the resonant frequency;
   wherein the passive LTI network is configured such that the tag only produces a response signal for trigger frequencies that are different from any of the resonant frequencies of the resonators, and
   wherein each resonator of the subharmonic tag is configured, responsive to the corresponding trigger frequency, to produce a response signal having a different frequency than the trigger frequency, the subharmonic tag configured to produce an output signal responding to the interrogation signal, the output signal including one or more of the response signals produced by the resonators.

2. The subharmonic tag of claim 1, wherein the two or more resonators are selected from a group consisting of microacoustic resonators and electromagnetic resonators.

3. The subharmonic tag of claim 2, wherein the two or more resonators are MEMS-based resonators.

4. The subharmonic tag of claim 2, wherein the resonators comprise at least one piezoelectric material selected from the group consisting of $LiNbO_3$, AlScN, AlCrN, PZT, $LiTaO_3$, GaN, AlN, or combinations thereof.

5. The subharmonic tag of claim 2, wherein the two or more resonators include at least one of a surface acoustic resonator, a bulk acoustic resonator, or combinations thereof.

6. The subharmonic tag of claim 1, wherein the subharmonic tag comprises three or more resonators, each resonator having a different resonant frequency.

7. The subharmonic tag of claim 6, wherein the subharmonic tag comprises eight or more resonators, each resonator having a different resonant frequency.

8. The subharmonic tag of claim 7, wherein the subharmonic tag comprises 32 or more resonators, each resonator having a different resonant frequency.

9. The subharmonic tag of claim 1, wherein the two or more resonators are built in an array directly on a silicon wafer.

10. The subharmonic tag of claim 1, wherein the resonant frequency of each resonator is in the UHF band.

11. The subharmonic tag of claim 1, wherein the frequency of the response signal produced by each resonator corresponds to the resonant frequency of the corresponding resonator.

12. The subharmonic tag of claim 11, wherein the frequency of the response signal produced by each resonator is the resonant frequency of the corresponding resonator.

13. The subharmonic tag of claim 1, wherein the subharmonic tag is a passive tag and does not include an internal power source.

14. A subharmonic system comprising:
a reader configured to produce an interrogation signal having a plurality of interrogation frequencies;
a plurality of subharmonic tags for passive far-field sensing, each subharmonic tag comprising:
at least one antenna disposed at a corresponding port, wherein each at least one antenna is configured as an input antenna, an output antenna, or an input/output antenna, the subharmonic tag configured, via the at least one antenna, to receive the interrogation signal;
a passive LTI network in electrical communication with the at least one antenna; and
two or more resonators in electrical communication with the passive LTI network, each resonator having a different resonant frequency and a corresponding trigger frequency, the corresponding trigger frequency being different than the resonant frequency;
wherein the passive LTI network is configured such that the tag only produces a response signal for trigger frequencies that are different from any of the resonant frequencies of the resonators, and
wherein each resonator of the subharmonic tag is configured, responsive to the corresponding trigger frequency, to produce a response signal having a different frequency than the trigger frequency, the subharmonic tag configured to produce an output signal responding to the interrogation signal, the output signal including the response signals produced by the resonators.

15. The system of claim 14, wherein the reader is configured to associate the response signals included in the output signal with identification information corresponding to each of the plurality of subharmonic tags to identify the subharmonic tag.

16. The system of claim 14, wherein each of the plurality of subharmonic tags has a combination of resonator frequencies that is unique within the system.

17. The system of claim 14, wherein each of the plurality of subharmonic tags is associated with an object to be identified or tracked.

18. The system of claim 17, wherein each of the plurality of subharmonic tags has a combination of resonator frequencies that is at least one of unique within the system, unique to a type of object associated with the system, unique to a location associated with the system, or combinations thereof.

19. The system of claim 14, wherein each of the plurality of subharmonic tags is a passive tag and does not include an internal power source.

20. A method of identifying or tracking a plurality of objects, the method comprising:
providing a subharmonic system, the system including:
a reader configured to produce an interrogation signal having a plurality of interrogation frequencies;
a plurality of subharmonic tags for passive far-field sensing, each subharmonic tag comprising:
at least one antenna disposed at a corresponding port, wherein each at least one antenna is configured as an input antenna, an output antenna, or an input/output antenna, the subharmonic tag configured, via the at least one antenna, to receive the interrogation signal;
a passive LTI network in electrical communication with the at least one antenna; and
two or more resonators in electrical communication with the passive LTI network, each resonator having a different resonant frequency and a corresponding trigger frequency, the corresponding trigger frequency being different than the resonant frequency;
wherein the passive LTI network is configured such that the tag only produces a response signal for trigger frequencies that are different from any of the resonant frequencies of the resonators, and
wherein each resonator of the subharmonic tag is configured, responsive to the corresponding trigger frequency, to produce a response signal having a different frequency than the trigger frequency, the subharmonic tag configured to produce an output signal responding to the interrogation signal, the output signal including the response signals produced by the resonators;
interrogating the subharmonic tags of the system using the reader;
receiving output signals from the subharmonic tags of the system using the reader; and
determining a presence, identity, and/or location of the subharmonic tags within the system based on the unique combination of resonance frequencies of each subharmonic tag of the system.

21. The method of claim 20, wherein the step of interrogating comprises emitting a chirp signal using the reader.

* * * * *